US012724240B2

(12) United States Patent
Sin

(10) Patent No.: US 12,724,240 B2
(45) Date of Patent: Sep. 1, 2026

(54) OPTICAL SYSTEM AND CAMERA MODULE COMPRISING SAME

(71) Applicant: LG INNOTEK CO., LTD., Seoul (KR)

(72) Inventor: Doo Shik Sin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 217 days.

(21) Appl. No.: 18/569,925

(22) PCT Filed: Jun. 17, 2022

(86) PCT No.: PCT/KR2022/008632
§ 371 (c)(1),
(2) Date: Dec. 13, 2023

(87) PCT Pub. No.: WO2022/265454
PCT Pub. Date: Dec. 22, 2022

(65) Prior Publication Data

US 2025/0013010 A1 Jan. 9, 2025

(30) Foreign Application Priority Data

Jun. 18, 2021 (KR) ........................ 10-2021-0079318

(51) Int. Cl.

| | |
|---|---|
| ***G02B 13/00*** | (2006.01) |
| ***G02B 9/64*** | (2006.01) |
| ***H04N 23/55*** | (2023.01) |

(52) U.S. Cl.
CPC ........... *G02B 13/0045* (2013.01); *G02B 9/64* (2013.01); *G02B 13/0055* (2013.01); *H04N 23/55* (2023.01)

(58) Field of Classification Search
CPC .. G02B 13/0045; G02B 9/64; G02B 13/0055; G02B 3/00; G02B 13/00; G02B 13/0065;
(Continued)

(56) References Cited

U.S. PATENT DOCUMENTS

| | | | | |
|---|---|---|---|---|
| 11,885,934 B2 * | 1/2024 | Wang | ................. | G02B 27/0025 |
| 2011/0141576 A1 * | 6/2011 | Seo | .................... | G02B 13/0045 359/683 |

(Continued)

FOREIGN PATENT DOCUMENTS

| | | |
|---|---|---|
| CN | 111427134 A | 7/2020 |
| CN | 111812822 B | 11/2020 |

(Continued)

OTHER PUBLICATIONS

International Search Report dated Sep. 19, 2022 in International Application No. PCT/KR2022/008632.

(Continued)

*Primary Examiner* — Mohammed A Hasan
(74) *Attorney, Agent, or Firm* — SALIWANCHIK, LLOYD & EISENSCHENK

(57) ABSTRACT

The optical system disclosed in the embodiment of the invention includes first to ninth lenses disposed along an optical axis in a direction from the object side to the sensor side, wherein the first and second lenses have positive (+) refractive power on the optical axis, the third lens and the ninth lens has a negative refractive power on the optical axis, the fifth lens has a meniscus shape convex from the optical axis toward the sensor, L1_CT is a thickness of the first lens on the optical axis, and L3_CT is a thickness of the third lens on the optical axis, and the following Equation may satisfy: Equation: $2 < L1\_CT/L3\_CT < 4$.

20 Claims, 3 Drawing Sheets

(58) Field of Classification Search
CPC .................. G02B 13/18; G02B 3/0087; G02B 2003/0093; H04N 23/55
USPC .......................................................... 359/708
See application file for complete search history.

(56) References Cited

U.S. PATENT DOCUMENTS

| | | | | |
|---|---|---|---|---|
| 2014/0184887 | A1* | 7/2014 | Yonetani | G02B 13/0015 359/557 |
| 2020/0241243 | A1 | 7/2020 | Hirano | |
| 2020/0249437 | A1 | 8/2020 | Hirano | |
| 2020/0285028 | A1 | 9/2020 | Hirano | |
| 2020/0393653 | A1 | 12/2020 | Chen | |
| 2024/0231052 | A1* | 7/2024 | Sin | G02B 13/18 |
| 2025/0264411 | A1* | 8/2025 | Bava | C12Q 1/6837 |

FOREIGN PATENT DOCUMENTS

| | | | | | |
|---|---|---|---|---|---|
| CN | 111929839 | B | | 12/2020 | |
| CN | 117539033 | A | * | 2/2024 | G02B 13/0015 |
| CN | 117724225 | A | * | 3/2024 | |
| JP | 2020-126183 | A | | 8/2020 | |
| JP | 6854575 | B2 | | 3/2021 | |
| KR | 10-2016-0075235 | A | | 6/2016 | |
| TW | I684807 | B | | 2/2020 | |

OTHER PUBLICATIONS

Office Action dated Mar. 25, 2026 in Taiwanese Application No. 111122722.

* cited by examiner

FIG. 1

OPTICAL SYSTEM AND CAMERA MODULE COMPRISING SAME

CROSS-REFERENCE TO RELATED APPLICATIONS

This application is the U.S. national stage application of International Patent Application No. PCT/KR2022/008632, filed Jun. 17, 2022, which claims the benefit under 35 U.S.C. § 119 of Korean Application No. 10-2021-0079318, filed Jun. 18, 2021, the disclosures of each of which are incorporated herein by reference in their entirety.

TECHNICAL FIELD

An embodiment relates to an optical system for improved optical performance and a camera module comprising the same.

BACKGROUND ART

The camera module captures an object and stores it as an image or video, and is installed in various applications. In particular, the camera module is produced in a very small size and is applied to not only portable devices such as smartphones, tablet PCs, and laptops, but also drones and vehicles to provide various functions. For example, the optical system of the camera module may include an imaging lens for forming an image, and an image sensor for converting the formed image into an electrical signal. In this case, the camera module may perform an autofocus (AF) function of aligning the focal lengths of the lenses by automatically adjusting the distance between the image sensor and the imaging lens, and may perform a zooning function of zooming up or zooning out by increasing or decreasing the magnification of a remote object through a zoom lens. In addition, the camera module employs an image stabilization (IS) technology to correct or inhibit image stabilization due to an unstable fixing device or a camera movement caused by a user's movement.

The most important element for this camera module to obtain an image is an imaging lens that forms an image. Recently, interest in high efficiency such as high image quality and high resolution is increasing, and research on an optical system including plurality of lenses is being conducted in order to realize this. For example, research using a plurality of imaging lenses having positive (+) and/or negative (−) refractive power to implement a high-efficiency optical system is being conducted. However, when a plurality of lenses is included, there is a problem in that it is difficult to derive excellent optical properties and aberration properties. In addition, when a plurality of lenses is included, the overall length, height, etc. may increase due to the thickness, interval, size, etc. of the plurality of lenses, thereby increasing the overall size of the module including the plurality of lenses. In addition, the size of the image sensor is increasing to realize high-resolution and high-definition. However, when the size of the image sensor increases, the TTL (Total Track Length) of the optical system including the plurality of lenses also increases, thereby increasing the thickness of the camera and the mobile terminal including the optical system. Therefore, a new optical system capable of solving the above problems is required.

DISCLOSURE

Technical Problem

An embodiment of the invention is to provide an optical system with improved optical properties. The embodiment is intended to provide an optical system having excellent optical performance at the center and the periphery of the angle of view. The embodiment is intended to provide an optical system capable of having a slim structure.

Technical Solution

An optical system according to an embodiment of the invention comprises first to ninth lenses disposed along an optical axis in a direction from an object side to a sensor side, the first lens has a positive (+) refractive power on the optical axis, the second lens has positive (+) refractive power on the optical axis, the third lens has negative (−) refractive power on the optical axis, and the ninth lens has negative (−) refractive power on the optical axis, wherein the fifth lens has a meniscus shape convex from the optical axis toward the sensor side, L1_CT is a thickness of the first lens in the optical axis, L3_CT is a thickness of the third lens in the optical axis, and the following equation satisfies: $2<L1\_CT/L3\_CT<4$.

According to an embodiment of the invention, the first lens may have a meniscus shape convex from the optical axis toward the object side. A refractive index of the third lens may be greater than 1.6. The second lens, the fourth lens, and the sixth lens may have positive (+) refractive power.

According to an embodiment of the invention, L1_CT is the thickness of the first lens on the optical axis, and L1_ET is a distance in an optical axis direction between the effective region end of an object-side surface of the first lens and an end of the effective region of the sensor-side surface of the first lens, and the following equation may satisfy: $0<L1\_ET/L1\_CT<1$.

An optical system according to an embodiment of the invention includes first to ninth lenses disposed along an optical axis in a direction from an object side to a sensor side, wherein the first lens has positive (+) refractive power on the optical axis, and the second lens has positive (+) refractive power on the optical axis, the third lens has negative (−) refractive power on the optical axis, and the ninth lens has negative (−) refractive power on the optical axis, and a sensor-side surface of the ninth lens may include a critical point, and the critical point of the ninth lens may be disposed in a range of 30% to 70% of an effective radius of the sensor-side surface of the ninth lens with respect to the optical axis.

According to an embodiment of the invention, CA_LIS1 is an effective diameter of the object-side surface of the first lens, CA_L3S2 is an effective diameter of the sensor-side surface of the third lens, the following equation may satisfy: $1<CA\_LIS1/CA\_L3S2<2$.

According to an embodiment of the invention, CA_L4S2 is an effective diameter of the sensor-side surface of the fourth lens, CA_L9S2 is an effective diameter of the sensor-side surface of the ninth lens, the following equation may satisfy: $1<CA\_L9S2/CA\_L4S2<5$.

According to an embodiment of the invention, a sensor-side surface of the eighth lens includes a critical point, and the critical point of the eighth lens may be disposed at 80% or less of an effective radius of the sensor-side surface of the eighth lens with respect to the optical axis.

According to an embodiment of the invention, the seventh lens may have a meniscus shape convex from the optical axis toward the object side, and a refractive index of the seventh lens may be greater than or equal to a refractive index of the eighth lens.

An optical system according to an embodiment of the invention includes first to ninth lenses disposed along an optical axis in a direction from an object side to a sensor side, wherein the first lens has positive (+) refractive power on the optical axis, the second lens has positive (+) refractive power on the optical axis, the third lens has negative (−) refractive power on the optical axis, the ninth lens has negative (−) refractive power on the optical axis, and a distance in a direction of the optical axis between the first and second lenses may decrease from the optical axis toward a direction perpendicular to the optical axis.

According to an embodiment of the invention, d12_CT is a distance on the optical axis between the sensor-side surface of the first lens and the object-side surface of the second lens, and d12_ET is a distance in a direction of the optical axis between an end of an effective region of the sensor-side surface of the first lens and an end of an effective region of the object-side surface of the second lens, and the following equation may satisfy: $1.5<d12\_CT/d12\_ET<3$.

According to an embodiment of the invention, the distance in a direction of the optical axis between the second and third lenses may increase from the optical axis toward a direction perpendicular to the optical axis.

According to an embodiment of the invention, d23_CT is a distance on the optical axis between the sensor-side surface of the second lens and the object-side surface of the third lens, and d23_ET is a distance in a direction of the optical axis between an end of an effective region of the sensor-side surface of the second lens and an end of an effective region of the object-side surface of the third lens, and the following equation may satisfy: $0.1<d23\_CT/d23\_ET<1$.

According to an embodiment of the invention, a distance in a direction of the optical axis between the eighth and ninth lenses increases from the optical axis toward a seventh point located on the sensor-side surface of the eighth lens, and decreases from the seventh point toward a eighth point located on the sensor-side surface of the eighth lens, and increases from the eighth point toward a ninth point located on the sensor-side surface of the eighth lens, wherein the eighth point is disposed more outside than the seventh point with respect to the optical axis, and the ninth point is disposed more outside than the eighth point with respect to the optical axis and may be an end of effective region of the sensor-side surface of the eighth lens.

A camera module according to an embodiment of the invention may include the optical system disclosed above.

Advantageous Effects

The optical system and the camera module according to the embodiment may have improved optical properties. In detail, the optical system may have improved resolution as a plurality of lenses have a set shape, focal length, and the like. The optical system and the camera module according to the embodiment may have improved distortion and aberration characteristics, and may have good optical performance at the center and the periphery of the field of view (FOV). The optical system according to the embodiment may have improved optical characteristics and a small total track length (TTL), so that the optical system and a camera module including the same may be provided in a slim and compact structure.

DESCRIPTION OF DRAWINGS

FIG. 1 is a configuration diagram of an optical system according to an embodiment.

BEST MODE

Figure 2:
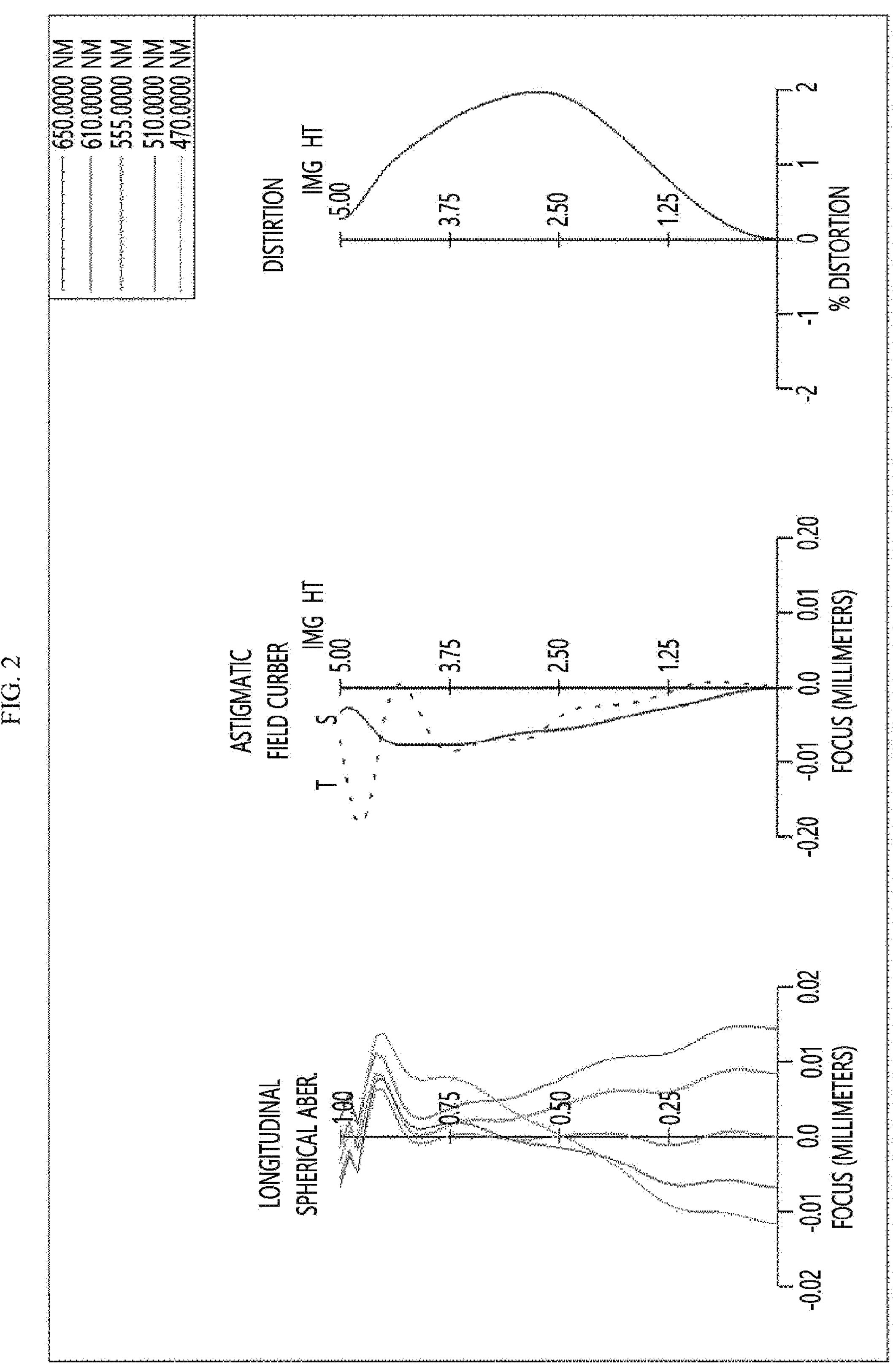
FIG. 2 is a graph illustrating an aberration diagram of an optical system according to the embodiment.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C.

In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

"Object-side surface" may refer to a surface of the lens facing the object-side surface with respect to the optical axis, and "sensor-side surface" may refer to a surface of the lens facing the imaging surface (image sensor) with respect to the optical axis. A convex surface of the lens may mean that the lens surface on the optical axis has a convex shape, and a concave surface of the lens may mean that the lens surface on the optical axis has a concave shape. The radius of curvature, center thickness, and distance between lenses described in the table for lens data may mean values on the optical axis, and the unit is mm. The vertical direction may mean a direction perpendicular to the optical axis, and an end of the lens or the lens surface may mean the end or edge of the effective region of the lens through which the incident light passes.

Figure 1:
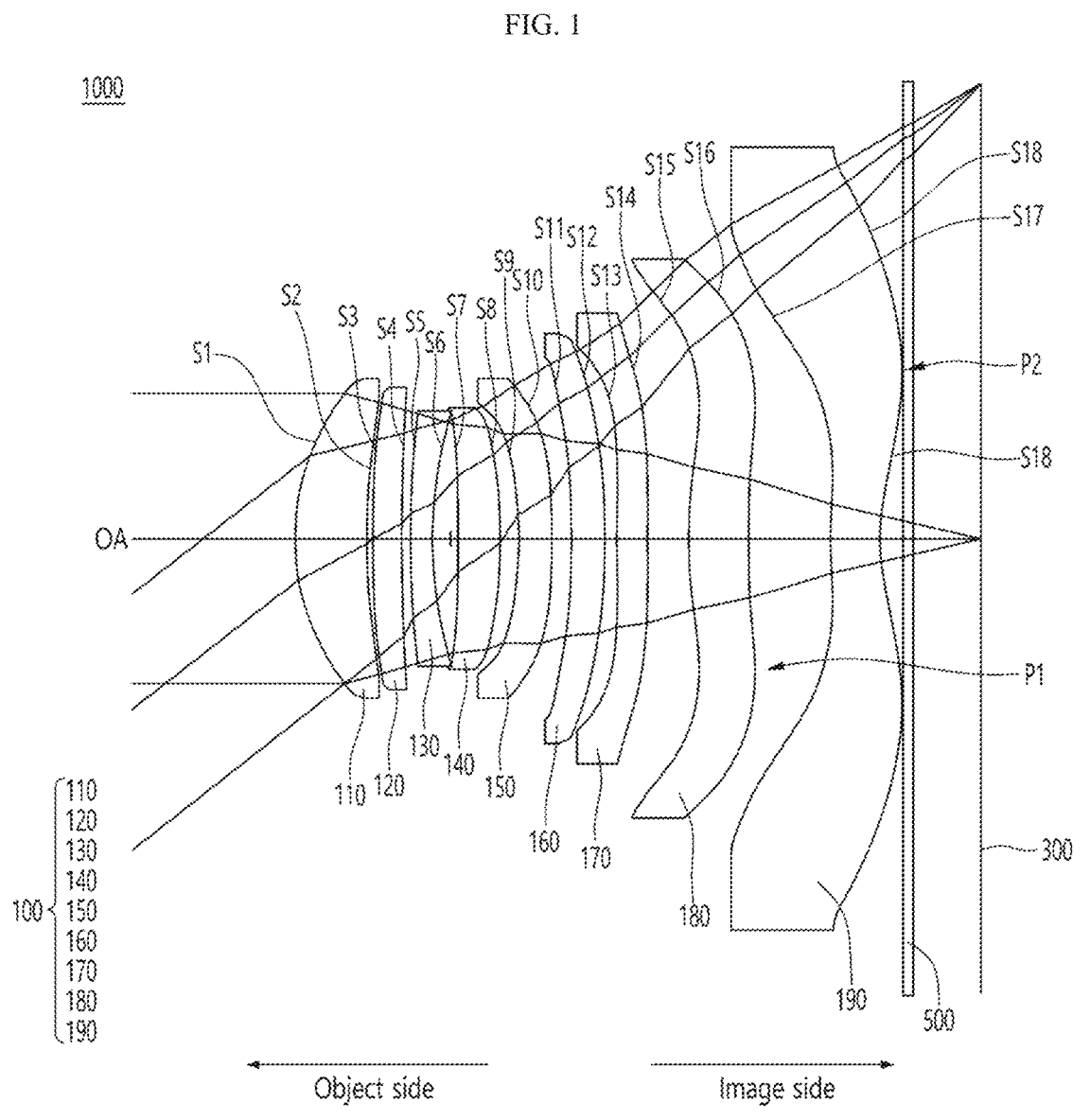

FIG. 1 is an optical system according to an embodiment. As shown in FIG. 1, the optical system 1000 may include a plurality of lenses 100 and an image sensor 300. For example, the optical system 1000 may include five or more lenses. In detail, the optical system 1000 may include eight or more lenses. The optical system 1000 may include a nine lens. The optical system 1000 may include a first lens 110 to a ninth lens 190 and an image sensor 300 sequentially arranged from the object side to the sensor side. The first to ninth lenses 110, 120, 130, 140, 150, 160, 170, 180, and 190 may be sequentially disposed along the optical axis OA of the optical system 1000. The light corresponding to an information of the object may pass through the first lens 110, the second lens 120, the third lens 130, the fourth lens 140, the fifth lens 150, the sixth lens 160, the seventh lens 170, the eighth lens 180, and the ninth lens 190 and be incident on the image sensor 300. Each of the plurality of lenses 100 may include an effective region and an ineffective region. The effective region may be a region through which light incident on each of the first to ninth lenses 110, 120, 130, 140, 150, 160, 170, 180, and 190 passes. That is, the effective region is an region in which incident light is refracted to implement optical properties, and may be expressed as an effective mirror. The ineffective region may be disposed around the effective region. The ineffective region may be a region to which light is not incident from the plurality of lenses 100. That is, the ineffective region may be a region independent of the optical characteristic. Also, the ineffective region may be a region fixed to a barrel (not shown) for accommodating the lens.

The image sensor 300 may detect light. In detail, the image sensor 300 may detect the light sequentially passing through the plurality of lenses 100, in detail, the plurality of lenses 100. The image sensor 300 may include a device capable of detecting incident light, such as a charge coupled device (CCD) or a complementary metal oxide semiconductor (CMOS).

The optical system 1000 according to the embodiment may further include a filter 500. The filter 500 may be disposed between the plurality of lenses 100 and the image sensor 300. The filter 500 may be disposed between the image sensor 300 and the last lens disposed closest to the image sensor 300 among the plurality of lenses 100. For example, when the optical system 100 includes nine lenses, the filter 500 may be disposed between the ninth lens 190 and the image sensor 300.

The filter 500 may include at least one of an infrared filter and an optical filter such as a cover glass. The filter 500 may pass light of a set wavelength band and filter light of a different wavelength band. When the filter 500 includes an infrared filter, radiant heat emitted from external light may be blocked from being transmitted to the image sensor 300. In addition, the filter 500 may transmit visible light and reflect infrared light.

The optical system 1000 according to the embodiment may include an aperture stop (not shown). The aperture stop may control the amount of light incident on the optical system 1000. The aperture stop may be disposed at a set position. For example, the aperture stop may be located in a front side of the first lens 110 or may be located at a rear side of the first lens 110. Also, the aperture stop may be disposed between two lenses selected from among the plurality of lenses 100. For example, the aperture stop may be positioned between the first lens 110 and the second lens 120. Alternatively, at least one lens selected from among the plurality of lenses 100 may serve as an aperture stop. In detail, the object side or sensor side of one lens selected from among the first to ninth lenses 110, 120, 130, 140, 150, 160, 170, 180, and 190 may serves as an aperture stop for controlling the amount of light. For example, the sensor-side surface (second surface S2) of the first lens 110 or the object-side surface (third surface S3) of the second lens 120 may serve as an aperture stop.

The optical system 1000 may include at least one light path changing member (not shown). The light path changing member may change the path of the light by reflecting the light incident from the outside. The light path changing member may include a reflector and a prism. For example, the light path changing member may include a right-angled prism. When the light path changing member includes a right-angle prism, the light path changing member may change the path of the light by reflecting the path of the incident light at an angle of 90 degrees. The light path changing member may be disposed closer to the object side than the plurality of lenses 100. That is, when the optical system 1000 includes one light path changing member, the optical path changing member, the first lens 110, the second lens 120, and the third lens 130, the fourth lens 140, the fifth lens 150, the sixth lens 160, the seventh lens 170, the eighth lens 180, the ninth lens 190, the filter 500 and the image sensors 300 may be arranged in order from the object side to the sensor direction. Alternatively, the light path changing member may be disposed between the plurality of lenses 100. For example, the light path changing member may be disposed between an nth lens and an n+1th lens. Alternatively, the light path changing member may be disposed between the plurality of lenses 100 and the image sensor 300. The light path changing member may change a path of light incident from the outside in a set direction. For example, when the optical path changing member is disposed closer to the object side than the plurality of lenses 100, the optical path changing member may change a path of the light incident on the optical path changing member in the first direction to the plurality of lenses to a second direction (a direction of the optical axis OA of the drawing in a direction in which a plurality of lenses 100 are spaced apart) that is an arrangement direction of the plurality of lenses 100.

When the optical system 1000 includes a light path changing member, the optical system may be applied to a folded camera capable of reducing the thickness of the camera. In detail, when the optical system 1000 includes the light path changing member, light incident in a direction perpendicular to the surface of the device to which the optical system 1000 is applied may be changed in a direction parallel to the surface of the device. Accordingly, the optical system 1000 including the plurality of lenses 100 may have a thinner thickness in the device, and thus the device may be provided thinner. For example, when the optical system 1000 does not include the light path changing member, the plurality of lenses 100 may be disposed to extend in a direction perpendicular to the surface of the device in the device. Accordingly, the optical system 1000 including the plurality of lenses 100 has a high height in a direction perpendicular to the surface of the device, and therefore, it may be difficult to form a thin thickness of the optical system 1000 and a device including the same. However, when the optical system 1000 includes the light path changing member, the plurality of lenses 100 may be disposed to extend in a direction parallel to the surface of the device. That is, the optical system 1000 is disposed so that the optical axis OA is parallel to the surface of the device, and may be applied to a folded camera. Accordingly, the optical system 1000 including the plurality of lenses 100 may have a low height in a direction perpendicular to the surface of the device. Accordingly, the camera including the optical system 1000 may have a thin thickness in the device, and the thickness of the device may also be reduced.

Hereinafter, the optical system 1000 according to the embodiment will be described in more detail.

FIG. 1 is a configuration diagram of an optical system according to an embodiment, and FIG. 2 is a graph illustrating an aberration diagram of an optical system according to an embodiment.

Referring to FIGS. 1 and 2, the optical system 1000 according to the embodiment includes the first lens 110 to the ninth lens 190 and the image sensor 300 sequentially arranged from the object side to the sensor side. The first to ninth lenses 110, 120, 130, 140, 150, 160, 170, 180, and 190 may be sequentially disposed along the optical axis OA of the optical system 1000. In the optical system 100 according to the embodiment, an aperture stop may be disposed between the first lens 110 and the second lens 120. In detail, the object-side surface of the second lens 120 may serve as an aperture stop. A filter 500 may be disposed between the plurality of lenses 100 and the image sensor 300. In detail, the filter 500 may be disposed between the ninth lens 190 and the image sensor 300.

TABLE 1

| Lens | Surface | Radius of curvature | Thickness(mm)/ Distance(mm) | Reflective Index | Abbe number | Effective diameter (mm) |
|---|---|---|---|---|---|---|
| Lens 1 | S1 | 2.488 | 0.798 | 1.5440 | 55.9000 | 3.200 |
| | S2 | 6.444 | 0.068 | | | 2.711 |
| Lens 2 | S3 (stop) | 11.513 | 0.328 | 1.5440 | 55.9000 | 2.694 |
| | S4 | 20.071 | 0.090 | | | 2.565 |
| Lens 3 | S5 | 5.924 | 0.250 | 1.6710 | 19.2000 | 2.494 |
| | S6 | 3.810 | 0.277 | | | 2.391 |
| Lens 4 | S7 | 414.501 | 0.471 | 1.5440 | 55.9000 | 2.600 |
| | S8 | −7.364 | 0.212 | | | 2.781 |
| Lens 5 | S9 | −6.421 | 0.361 | 1.6710 | | 2.849 |
| | S10 | −12.469 | 0.226 | | 19.2000 | 3.300 |
| Lens 6 | S11 | −9.515 | 0.376 | 1.5540 | 48.1000 | 3.760 |
| | S12 | −7.500 | 0.124 | | | 4.030 |
| Lens 7 | S13 | 22.595 | 0.334 | 1.5880 | 28.2000 | 4.096 |
| | S14 | 24.221 | 0.477 | | | 4.659 |
| Lens 8 | S15 | 5.407 | 0.660 | 1.5880 | 28.2000 | 5.392 |
| | S16 | 11.710 | 0.923 | | | 6.072 |
| Lens 9 | S17 | 7.912 | 0.550 | 1.5440 | 55.9000 | 6.860 |
| | S18 | 2.228 | 0.258 | | | 8.163 |
| Filter | | Infinity | 0.110 | | | 9.027 |
| | | Infinity | 0.750 | | | 9.106 |
| Image sensor | | Infinity | 0.000 | | | 10.006 |

Table 1 shows the radius of curvature on the optical axis OA, a center thickness of each lens, a center distance between adjacent lenses, the refractive index at the d-line, the Abbe number (Abbe #) and the effective diameter (or a size of the clear aperture (CA)) of the first to ninth lenses 110, 120, 130, 140, 150, 160, 170, 180, and 190 according to the embodiment. The first lens 110 may have a positive (+) refractive power on the optical axis OA. The first lens 110 may include a plastic or glass material. For example, the first lens 110 may be made of a plastic material. The first lens 110 may include a first surface S1 defined as an object-side surface and a second surface S2 defined as a sensor-side surface. The first surface S1 may have a convex shape on the optical axis OA, and the second surface S2 may have a concave shape on the optical axis OA. That is, the first lens 110 may have a meniscus shape convex from the optical axis OA toward the object. At least one of the first surface S1 and the second surface S2 may be an aspherical surface. For example, both the first surface S1 and the second surface S2 may be aspherical. The first surface S1 and the second surface S2 may have aspheric coefficients as shown in Table 2 below.

The second lens 120 may have positive (+) or negative (−) refractive power on the optical axis OA. In detail, the second lens 120 may have a positive (+) refractive power on the optical axis OA. In addition, the second lens 120 may include a plastic or glass material. The second lens 120 may be made of a plastic material. The second lens 120 may include a third surface S3 defined as an object-side surface and a fourth surface S4 defined as a sensor-side surface. The third surface S3 may have a convex shape on the optical axis OA, and the fourth surface S4 may have a concave shape on the optical axis OA. That is, the second lens 120 may have a meniscus shape convex from the optical axis OA toward the object. Alternatively, the third surface S3 may have a convex shape on the optical axis OA, and the fourth surface S4 may have a convex shape on the optical axis OA. That is, the second lens 120 may have a shape in which both sides are convex on the optical axis OA. Alternatively, the third surface S3 may have a concave shape on the optical axis OA, and the fourth surface S4 may have a concave shape on the optical axis OA. That is, the second lens 120 may have a concave shape on both sides of the optical axis OA. Alternatively, the third surface S3 may have a concave shape on the optical axis OA, and the fourth surface S4 may have a convex shape on the optical axis OA. That is, the second lens 120 may have a meniscus shape convex from the optical axis OA toward the sensor. In detail, referring to Table 1, the second lens 120 may have a meniscus shape convex toward the object from the optical axis OA among the above-described shapes. At least one of the third surface S3 and the fourth surface S4 may be an aspherical surface. For example, both the third surface S3 and the fourth surface S4 may be aspherical. The third surface S3 and the fourth surface S4 may have aspheric coefficients as shown in Table 2 below.

The third lens 130 may have negative (−) refractive power on the optical axis OA. In addition, the third lens 130 may include a plastic or glass material. The third lens 130 may be made of a plastic material. The third lens 130 may include a fifth surface S5 defined as an object-side surface and a sixth surface S6 defined as a sensor-side surface. The fifth surface S5 may have a convex shape on the optical axis OA, and the sixth surface S6 may have a concave shape on the optical axis OA. That is, the third lens 130 may have a meniscus shape convex toward the object from the optical axis OA. Alternatively, the fifth surface S5 may have a concave shape on the optical axis OA, and the sixth surface S6 may have a concave shape on the optical axis OA. That is, the third lens 130 may have a concave shape on both sides of the optical axis OA. In detail, referring to Table 1, the third lens 130 may have a meniscus shape convex toward the object from the optical axis OA among the above-described shapes. At least one of the fifth surface S5 and the sixth surface S6 may be an aspherical surface. For example, both the fifth surface S5 and the sixth surface S6 may be aspherical. The fifth surface S5 and the sixth surface S6 may have aspheric coefficients as shown in Table 2 below.

The fourth lens 140 may have positive (+) or negative (−) refractive power on the optical axis OA. In detail, the fourth lens 140 may have a positive (+) refractive power on the optical axis OA. In addition, the fourth lens 140 may include a plastic or glass material. The fourth lens 140 may be made of a plastic material. The fourth lens 140 may include a seventh surface S7 defined as an object-side surface and an eighth surface S8 defined as a sensor-side surface. The seventh surface S7 may have a convex shape on the optical axis OA, and the eighth surface S8 may have a convex shape on the optical axis OA. That is, the fourth lens 140 may have a shape in which both sides are convex in the optical axis OA. Alternatively, the seventh surface S7 may have a concave shape on the optical axis OA, and the eighth surface S8 may have a convex shape on the optical axis OA. That is, the fourth lens 140 may have a meniscus shape convex from the optical axis OA toward the sensor. In detail, referring to Table 1, the fourth lens 140 may have a shape in which both sides are convex in the optical axis OA, among the above-described shapes. At least one of the seventh surface S7 and the eighth surface S8 may be an aspherical surface. For example, both the seventh surface S7 and the eighth surface S8 may be aspherical. The seventh surface S7 and the eighth surface S8 may have aspheric coefficients as shown in Table 2 below.

The fifth lens 150 may have positive (+) or negative (−) refractive power on the optical axis OA. In detail, the fifth lens 150 may have a negative refractive power on the optical axis OA. In addition, the fifth lens 150 may include a plastic or glass material. The fifth lens 150 may be made of a plastic material. The fifth lens 150 may include a ninth surface S9 defined as an object-side surface and a tenth surface S10 defined as a sensor-side surface. The ninth surface S9 may have a concave shape on the optical axis OA, and the tenth surface S10 may have a convex shape on the optical axis OA. That is, the fifth lens 150 may have a meniscus shape convex from the optical axis OA toward the sensor. At least one of the ninth surface S9 and the tenth surface S10 may be an aspherical surface. For example, both the ninth surface S9 and the tenth surface S10 may be aspherical. The ninth surface S9 and the tenth surface S10 may have aspheric coefficients as shown in Table 2 below.

The sixth lens 160 may have positive (+) or negative (−) refractive power on the optical axis OA. In detail, the sixth lens 160 may have a positive (+) refractive power on the optical axis OA. In addition, the sixth lens 160 may include a plastic or glass material. The sixth lens 160 may be made of a plastic material. The sixth lens 160 may include an eleventh surface S11 defined as an object-side surface and a twelfth surface S12 defined as a sensor-side surface. The eleventh surface S11 may have a convex shape on the optical axis OA, and the twelfth surface S12 may have a concave shape on the optical axis OA. That is, the sixth lens 160 may have a meniscus shape convex from the optical axis OA toward the object. Alternatively, the eleventh surface S11 may have a convex shape on the optical axis OA, and the twelfth surface S12 may have a convex shape on the optical axis OA. That is, the sixth lens 160 may have a shape in which both sides are convex on the optical axis OA. Alternatively, the eleventh surface S11 may have a concave shape on the optical axis OA, and the twelfth surface S12 may have a concave shape on the optical axis OA. That is, the sixth lens 160 may have a concave shape on both sides of the optical axis OA. Alternatively, the eleventh surface S11 may have a concave shape on the optical axis OA, and the twelfth surface S12 may have a convex shape on the optical axis OA. That is, the sixth lens 160 may have a meniscus shape convex from the optical axis OA toward the sensor. Specifically, referring to Table 1, the sixth lens 160 may have a meniscus shape convex toward the sensor from the optical axis OA among the above-described shapes. At least one of the eleventh surface S11 and the twelfth surface S12 may be an aspherical surface. For example, both the eleventh surface S11 and the twelfth surface S12 may be aspherical. The eleventh surface S11 and the twelfth surface S12 may have aspheric coefficients as shown in Table 2 below.

The seventh lens 170 may have positive (+) or negative (−) refractive power on the optical axis OA. In detail, the seventh lens 170 may have a positive (+) refractive power on the optical axis OA. In addition, the seventh lens 170 may include a plastic or glass material. The seventh lens 170 may be made of a plastic material. The seventh lens 170 may include a thirteenth surface S13 defined as an object-side surface and a fourteenth surface S14 defined as a sensor-side surface. The thirteenth surface S13 may have a convex shape on the optical axis OA, and the fourteenth surface S14 may have a concave shape on the optical axis OA. That is, the seventh lens 170 may have a meniscus shape convex from the optical axis OA toward the object. Alternatively, the thirteenth surface S13 may be convex on the optical axis OA, and the fourteenth surface S14 may be convex on the optical axis OA. That is, the seventh lens 170 may have a shape in which both sides are convex in the optical axis OA. Alternatively, the thirteenth surface S13 may be concave on the optical axis OA, and the fourteenth surface S14 may be concave on the optical axis OA. That is, the seventh lens 170 may have a concave shape on both sides of the optical axis OA. Alternatively, the thirteenth surface S13 may be concave on the optical axis OA, and the fourteenth surface S14 may be convex on the optical axis OA. That is, the seventh lens 170 may have a meniscus shape convex from the optical axis OA toward the sensor. In detail, referring to Table 1, the seventh lens 170 may have a meniscus shape convex toward the object from the optical axis OA among the above-described shapes. At least one of the eleventh surface S11 and the twelfth surface S12 may be an aspherical surface. For example, both the eleventh surface S11 and the twelfth surface S12 may be aspherical. The eleventh surface S11 and the twelfth surface S12 may have aspheric coefficients as shown in Table 2 below. The refractive index of the seventh lens 170 may be greater than or equal to the refractive index of the eighth lens 180, and may be greater than the refractive index of the ninth lens 190. Also, the Abbe number of the seventh lens 170 may be greater than or equal to the Abbe number of the eighth lens 180, and may be smaller than the Abbe number of the ninth lens 190. For example, referring to Table 1, the refractive index and Abbe number of the seventh lens 170 and the eighth lens 180 may be the same.

The eighth lens 180 may have positive (+) or negative (−) refractive power on the optical axis OA. In detail, the eighth lens 180 may have a positive (+) refractive power on the optical axis OA. In addition, the eighth lens 180 may include a plastic or glass material. The eighth lens 180 may be made of a plastic material. The eighth lens 180 may include a fifteenth surface S15 defined as an object-side surface and a sixteenth surface S16 defined as a sensor-side surface. The fifteenth surface S15 may have a convex shape on the optical axis OA, and the sixteenth surface S16 may have a concave shape on the optical axis OA. That is, the eighth lens 180 may have a meniscus shape convex from the optical axis OA toward the object. Alternatively, the fifteenth surface S15 may have a convex shape on the optical axis OA, and the sixteenth surface S16 may have a convex shape on the optical axis OA. That is, the eighth lens 180 may have a shape in which both sides are convex in the optical axis OA. Specifically, referring to Table 1, the eighth lens 180 may have a meniscus shape convex toward the object from the optical axis OA among the above-described shapes. At least one of the fifteenth surface S15 and the sixteenth surface S16 may be an aspherical surface. For example, both the fifteenth surface S15 and the sixteenth surface S16 may be aspherical. The fifteenth surface S15 and the sixteenth surface S16 may have aspheric coefficients as shown in Table 2 below.

The eighth lens 180 may include at least one critical point. In detail, at least one of the fifteenth surface S15 and the sixteenth surface S16 may include a critical point. Here, the critical point may mean a point at which a slope of the tangent to the lens surface is 0. In detail, the critical point is a point at which the sign of the inclination value with respect to the optical axis OA and the direction perpendicular to the optical axis OA changes from positive (+) to negative (−) or from negative (−) to positive (+), and may mean a point at which the slope value is 0. The tangent line at the critical point may be perpendicular to the optical axis OA. For example, the sixteenth surface S16 may include a first critical point P1. When the optical axis OA is the starting point and the effective region end of the sixteenth surface S16 of the eighth lens 180 is the endpoint, the first inflection point P1 may be disposed at a position of about 80% or less of the effective radius of the sixteenth surface S16 with respect to the optical axis. In detail, the first critical point P1 may be disposed in a range of about 20% to about 80% of the effective radius of the sixteenth surface S16 of the eighth lens 180 with respect to the optical axis. Here, the position of the first critical point P1 is a position set with respect to a direction perpendicular to the optical axis OA and may mean a straight-line distance from the optical axis OA to the first critical point P1. The distance between the starting point, which is the optical axis of each lens surface, and the end or edge of the effective region represents the effective radius.

The ninth lens 190 may have negative (−) refractive power from the optical axis OA to the optical axis OA. The ninth lens 190 may include a plastic or glass material. The ninth lens 190 may be made of a plastic material. The ninth lens 190 may include a seventeenth surface S17 defined as an object-side surface and an eighteenth surface S18 defined as a sensor-side surface. The seventeenth surface S17 may have a convex shape on the optical axis OA, and the eighteenth surface S18 may have a concave shape on the optical axis OA. That is, the ninth lens 190 may have a meniscus shape convex on the optical axis OA toward object. Alternatively, the seventeenth surface S17 may have a concave shape on the optical axis OA, and the eighteenth surface S18 may have a concave shape on the optical axis OA. That is, the ninth lens 190 may have a concave shape on both sides of the optical axis OA. In detail, referring to Table 1, the ninth lens 190 may have a meniscus shape convex toward the object from the optical axis OA among the above-described shapes.

The ninth lens 190 may include at least one critical point. In detail, at least one of the seventeenth surface S17 and the eighteenth surface S18 may include a critical point. For example, the eighteenth surface S18 may include a second critical point P2. When the optical axis OA is a starting point and the effective region end of the eighteenth surface S18 of the ninth lens 190 is an endpoint, the second critical point P2 may be disposed at a position less than about 70% or less of an effective radius of the eighteenth surface S18 with respect to the optical axis. In detail, the second critical point P2 may be disposed at a position of about 30% to about 70% of the effective radius of the eighteenth surface S18 with respect to the optical axis. In more detail, the second critical point P2 may be disposed at a position of about 40% to about 60% of the effective radius of the eighteenth surface S18 with respect to the optical axis. Here, the position of the second critical point P2 is a position set with respect to a direction perpendicular to the optical axis OA and may mean a straight-line distance from the optical axis OA to the second critical point P2.

The values of the aspheric coefficients of each lens surface in the optical system 1000 according to the embodiment are shown in Table 2 below.

TABLE 2

| | L1 | | L2 | | L3 | | L4 | | L5 |
|---|---|---|---|---|---|---|---|---|---|
| | S1 | S2 | S3 | S4 | S5 | S6 | S7 | S8 | S9 |
| R | 2.488 | 6.444 | 11.513 | 20.071 | 5.924 | 3.810 | 414.501 | −7.364 | −6.421 |
| C2 | 1.60.E+00 | 1.51.E+00 | 1.50.E+00 | 1.43.E+00 | 1.39.E+00 | 1.48.E+00 | 1.30.E+00 | 1.43.E+00 | 1.47.E+00 |
| C1 | −5.07.E−01 | −2.93.E+01 | −1.22.E+01 | −2.63.E+00 | −5.58.E+01 | −8.58.E+00 | 9.50.E+01 | 1.97.E+01 | 1.43.E+01 |
| C4 | 2.31.E−02 | −7.49.E−03 | −6.50.E−03 | −9.03.E−03 | −2.49.E−02 | −1.07.E−02 | −5.58.E−02 | −5.50.E−02 | −1.63.E−01 |
| C5 | −7.13.E−04 | −1.63.E−03 | −1.10.E−04 | −5.68.E−04 | 7.78.E−03 | 1.27.E−02 | −7.55.E−03 | −8.09.E−03 | −1.65.E−02 |
| C6 | −4.19.E−04 | 2.73.E−03 | 2.43.E−03 | 3.24.E−05 | 8.65.E−04 | −1.52.E−04 | 4.30.E−04 | 1.31.E−03 | −4.35.E−03 |
| C7 | −6.16.E−05 | −1.04.E−04 | −1.86.E−04 | 1.21.E−04 | −7.48.E−07 | −9.96.E−04 | 3.13.E−04 | −6.83.E−05 | −2.36.E−03 |
| C8 | 4.74.E−06 | −1.36.E−04 | −1.20.E−04 | 3.33.E−05 | 5.95.E−05 | −1.42.E−03 | 1.78.E−04 | −6.34.E−05 | −6.59.E−04 |
| C9 | 2.67.E−06 | 4.79.E−05 | 9.87.E−05 | 5.67.E−05 | −2.59.E−05 | −9.09.E−04 | 2.61.E−05 | −2.27.E−04 | −5.83.E−04 |
| C10 | −1.82.E−06 | 2.56.E−05 | 3.55.E−05 | 1.73.E−05 | 4.77.E−06 | −9.91.E−05 | −7.18.E−07 | −9.60.E−05 | −2.55.E−04 |
| C11 | −4.92.E−06 | 3.94.E−05 | 5.44.E−05 | 2.63.E−05 | 1.08.E−05 | 4.48.E−04 | −3.94.E−07 | −3.71.E−05 | −1.58.E−04 |
| C12 | −2.58.E−06 | 1.59.E−05 | 1.61.E−05 | 4.42.E−06 | 2.48.E−06 | 6.56.E−04 | 2.78.E−06 | −1.62.E−05 | −1.20.E−04 |
| C13 | −2.35.E−06 | −3.76.E−06 | | | 4.87.E−07 | 6.13.E−04 | 1.52.E−06 | −9.74.E−06 | −8.93.E−05 |
| C14 | −1.69.E−06 | −1.65.E−06 | | | 1.07.E−06 | 4.27.E−04 | −2.29.E−07 | −5.33.E−06 | −5.54.E−05 |

TABLE 2-continued

| | | | | | | | | | |
|---|---|---|---|---|---|---|---|---|---|
| C15 | −2.30.E−07 | −2.63.E−06 | | | −3.56.E−07 | 2.28.E−04 | −9.86.E−07 | −4.57.E−06 | −3.21.E−05 |
| C16 | 4.60.E−07 | 1.29.E−06 | | | −4.33.E−07 | 8.76.E−05 | 3.40.E−07 | −9.47.E−07 | −1.38.E−05 |
| C17 | 1.60.E−06 | −3.87.E−07 | | | 2.60.E−07 | 1.94.E−05 | −3.12.E−07 | −2.05.E−07 | −4.39.E−06 |

| | L5 | L6 | | L7 | | L8 | | L9 | |
|---|---|---|---|---|---|---|---|---|---|
| | S10 | S11 | S12 | S13 | S14 | S15 | S16 | S17 | S18 |
| R | −12.469 | −9.515 | −7.500 | 22.595 | 24.221 | 5.407 | 11.710 | 7.912 | 2.228 |
| C2 | 1.68.E+00 | 1.91.E+00 | 2.05.E+00 | 2.14.E+00 | 2.36.E+00 | 3.06.E+00 | 3.46.E+00 | 4.42.E+00 | 4.92.E+00 |
| C1 | 4.68.E+01 | 1.23.E+01 | 6.04.E+00 | 5.04.E+01 | 7.54.E+01 | −7.89.E−01 | −1.44.E+01 | −5.42.E+01 | −5.90.E+00 |
| C4 | −2.49.E−01 | −8.55.E−03 | 7.12.E−04 | −5.57.E−01 | −4.95.E−01 | −1.68.E+00 | −1.66.E+00 | −2.40.E+00 | −3.15.E+00 |
| C5 | 3.55.E−04 | 2.41.E−03 | −1.68.E−03 | −2.89.E−02 | 5.54.E−02 | 1.10.E−01 | −3.01.E−02 | 1.29.E+00 | 1.11.E+00 |
| C6 | 2.61.E−03 | 1.41.E−03 | −5.21.E−04 | 1.25.E−03 | −4.84.E−03 | 5.59.E−02 | 6.67.E−02 | −4.69.E−01 | −1.86.E−01 |
| C7 | 9.84.E−04 | −2.33.E−03 | −3.22.E−04 | 1.57.E−02 | 7.56.E−03 | 6.40.E−03 | −1.48.E−02 | 1.25.E−01 | 1.04.E−01 |
| C8 | 1.62.E−03 | 9.53.E−04 | 4.13.E−04 | 5.15.E−03 | −1.36.E−03 | 2.14.E−03 | 1.19.E−02 | −3.16.E−02 | −7.39.E−02 |
| C9 | 3.27.E−04 | −1.45.E−04 | 1.42.E−03 | 3.75.E−03 | −2.12.E−04 | −6.84.E−03 | −8.12.E−03 | 1.22.E−03 | 3.23.E−03 |
| C10 | 2.72.E−04 | −2.69.E−05 | 7.58.E−05 | 2.04.E−04 | −3.39.E−04 | −8.88.E−04 | −1.08.E−03 | −2.42.E−03 | 1.46.E−03 |
| C11 | 4.71.E−05 | −2.05.E−04 | −6.98.E−05 | −4.61.E−04 | −1.23.E−04 | −2.75.E−04 | 7.41.E−04 | 2.37.E−03 | 2.88.E−02 |
| C12 | −4.23.E−05 | −1.66.E−04 | −1.83.E−04 | −4.90.E−04 | 1.50.E−04 | −3.83.E−04 | 2.92.E−04 | −6.79.E−03 | 6.35.E−03 |
| C13 | −3.07.E−05 | 4.46.E−07 | −3.73.E−08 | −2.74.E−04 | 2.11.E−05 | −2.44.E−04 | −9.46.E−04 | 5.97.E−03 | 2.24.E−03 |
| C14 | −1.56.E−05 | 4.72.E−07 | 5.29.E−07 | −1.55.E−04 | 1.12.E−05 | 3.57.E−04 | −8.16.E−04 | −3.40.E−04 | −7.77.E−04 |
| C15 | −6.65.E−06 | −1.80.E−07 | 2.64.E−08 | −9.07.E−05 | −1.63.E−05 | 2.45.E−04 | −5.00.E−04 | −3.18.E−03 | 2.46.E−03 |
| C16 | −7.45.E−07 | 1.10.E−07 | 7.38.E−07 | −4.04.E−05 | −1.48.E−06 | 6.72.E−05 | −2.32.E−04 | 7.61.E−04 | 2.62.E−03 |
| C17 | −2.41.E−07 | −4.93.E−07 | 3.47.E−09 | −1.05.E−05 | 8.55.E−08 | −1.29.E−05 | −7.49.E−05 | 1.25.E−03 | 1.45.E−03 |

In the optical system 1000 according to the embodiment, the Sag value of each lens surface may satisfy the following equation.

$$Z = \frac{cr^2}{1 + \sqrt{1 - (1 + k)c^2 r^2}} + u^4 \sum_{m=0}^{13} a_m Q_m^{con}(u^2) \quad \text{[Equation]}$$

The meaning of each item in the above equation is as follows.

Z: The sag of the surface parallel to the Z-axis (in lens units)

c: The vertex curvature (CUY)

k: The conic constant r: The radial distance $r_n$: The normalization radius (NRADIUS)

u: $r/r_n$ $a_m$: The $m^{th}Q^{con}$ coefficient, which correlates to surface sag departure $Q_m^{con}$: The $m^{th}Q^{con}$ polynomial As described above, at least one lens surface of the plurality of lenses 100 according to the embodiment may include an aspherical surface having a 30th order aspheric coefficient. For example, in the embodiment, the lens surfaces of the lenses other than the second lens 120 may have a 30th-order aspherical coefficient. As described above, since the aspherical surface having the 30th order aspheric coefficient (a value other than "0") may significantly change the aspherical shape of the peripheral portion, the optical performance of the peripheral portion of the field of view (FOV) may be well corrected.

The optical system 1000 according to the embodiment may satisfy at least one or two or more of the following equations. Accordingly, the optical system 1000 according to the embodiment may have improved resolution. In addition, since the optical system 1000 may effectively control distortion and aberration characteristics, and may have good optical performance even at the center portion and peripheral portions of the angle of view. In addition, the optical system 1000 may have a slimmer and more compact structure.

$$2 < L1\_CT/L3\_CT < 4 \quad \text{[Equation 1]}$$

In Equation 1, L1_CT means a thickness (mm) on the optical axis OA of the first lens 110, and L3_CT means a thickness (mm) on the optical axis OA of the third lens 130. When the optical system 1000 according to the embodiment satisfies Equation 1, the optical system 1000 may improve aberration characteristics.

$$0 < L1\_ET/L1\_CT < 1 \quad \text{[Equation 2]}$$

In Equation 2, L1_CT means a thickness (mm) on the optical axis OA of the first lens 110, and L1 ET means a thickness (mm) in a direction of the optical axis OA at the end of the effective region of the first lens 110. In detail, L1_ET is a distance in the direction of the optical axis OA between the end of the effective region of the object-side surface (first surface S1) of the first lens 110 and the end of the effective region of the sensor-side surface (second surface S2) of the first lens 110. When the optical system 1000 according to the embodiment satisfies Equation 2, the optical system 1000 may control the incident light and thus have improved resolution.

$$1 < L9\_ET/L9\_CT < 4 \quad \text{[Equation 3]}$$

In Equation 3, L9_CT means a thickness (mm) of the ninth lens 190 on the optical axis OA, and L9_ET means a thickness (mm) in the direction of the optical axis OA at the end of the effective region of the ninth lens 190. In detail, L9_ET is a distance in the direction of the optical axis OA between an end of the effective region of the object-side surface (seventeenth surface S17) of the ninth lens 190 and an end of the effective region of the sensor-side surface (eighteenth surface S18) of the ninth lens 190. When the optical system 1000 according to the embodiment satisfies Equation 3, the optical system 1000 may reduce distortion.

$$1.6 < n3 \quad \text{[Equation 4]}$$

In Equation 4, n3 means a refractive index at the d-line of the third lens. When the optical system 1000 according to the embodiment satisfies Equation 4, the optical system 1000 may reduce occurrence of chromatic aberration.

$$1 < CA\_L1S1/CA\_L3S2 < 2 \quad \text{[Equation 5]}$$

In Equation 5, CA_LIS1 means an effective diameter (or clear aperture (CA)) (mm) of the object-side surface (first surface S1) of the first lens 110, and CA_L3S2 means an effective diameter (or clear aperture (CA)) (mm) of the sensor-side surface (sixth surface (S6)) of the third lens 130. When the optical system 1000 according to the embodiment satisfies Equation 5, the optical system 1000 may improve aberration characteristics.

$$1 < CA\_L9S2/CA\_L4S2 < 5 \quad \text{[Equation 6]}$$

In Equation 6, CA_L4S2 means an effective diameter (or clear aperture (CA)) (mm) of the sensor-side surface (the eighth surface S8) of the fourth lens 140, and CA_L9S2 means an effective diameter (or clear aperture (CA)) (mm) of the sensor-side surface (eighteenth surface (S18) of the ninth lens 190. When the optical system 1000 according to the embodiment satisfies Equation 6, the optical system 1000 may improve aberration characteristics.

$$1 < d34\_CT/d34\_ET < 5 \quad \text{[Equation 7]}$$

In Equation 7, d34_CT means a distance (mm) on the optical axis OA between the sensor-side surface (sixth surface S6) of the third lens 130 and the object-side surface (seventh surface S7) of the fourth lens 140. d34_ET means a distance (mm) between the end of the effective region of the sensor-side surface (sixth surface S6) of the third lens 130 and the end of the effective region of the object-side surface (seventh surface S7) of the fourth lens 140 in the direction of the optical axis OA. When the optical system 1000 according to the embodiment satisfies Equation 7, the optical system 1000 may reduce chromatic aberration and improve aberration characteristics of the optical system 1000.

$$1 < d89\_CT/d89\_min < 10 \quad \text{[Equation 8]}$$

In Equation 8, d89_CT means a distance (mm) on the optical axis OA between the sensor-side surface (sixteenth surface S16) of the eighth lens 180 and the object-side surface (seventeenth surface S17) of the ninth lens 190. D89_min means the minimum distance among the distance in a direction of the optical axis OA between the sensor-side surface (sixteenth surface (S16)) of the eighth lens 180 and the object-side surface (seventeenth surface (S17)) of the ninth lens 190. When the optical system 1000 according to the embodiment satisfies Equation 8, the optical system 1000 may improve distortion aberration characteristics.

$$0.3 < L9S2 \text{ Critical point} < 0.7 \quad \text{[Equation 9]}$$

In Equation 9, L9S2 Critical point may mean the position of the critical point located on the sensor-side surface (eighteenth surface S18) of the ninth lens 190. In detail, when the optical axis OA is the starting point, the end of the effective region of the eighteenth surface S18 of the ninth lens 190 is the endpoint, and a vertical length of the optical axis OA from the optical axis OA to end of the effective region of the eighteenth surface S18 is 1, L9S2 Critical point may mean the position of the critical point (e.g., the second critical point P2) located on the eighteenth surface S18. When the optical system 1000 according to the embodiment satisfies Equation 9, the optical system 1000 may improve distortion aberration characteristics.

$$5 < CA\_L3S2/L3\_CT < 10 \quad \text{[Equation 10]}$$

In Equation 10, CA_L3S2 means the effective diameter (CA, mm) of the sensor-side surface (sixth surface S6) of the third lens 130, and L3_CT means is a thickness (mm) on the optical axis OA of the third lens 130. When the optical system 1000 according to the embodiment satisfies Equation 10, the optical system 1000 may inhibit or minimize the occurrence of a decrease in the amount of light in the periphery portion of the field of view (FOV), thereby controlling the vignetting characteristic.

$$1 < L2\_CT/L2\_ET < 2.5 \quad \text{[Equation 11]}$$

In Equation 11, L2_CT means a thickness (mm) on the optical axis OA of the second lens 120, and L2_ET means a distance (mm) in a direction of the optical axis OA direction at the end of the effective region of the second lens 120. In detail, L2_ET means a distance (mm) in the direction of the optical axis OA between the end of the effective region of the object-side surface (third surface S3) of the second lens 120 and an end of the effective region of the sensor-side surface (fourth surface S4) of the second lens 120. When the optical system 1000 according to the embodiment satisfies Equation 11, the optical system 1000 may improve aberration characteristics.

$$1 < L2\_CT/L3\_CT < 2.5 \quad \text{[Equation 12]}$$

In Equation 12, L2_CT means a thickness (mm) on the optical axis OA of the second lens 120, and L3_CT means a thickness (mm) on the optical axis OA of the third lens 130. When the optical system 1000 according to the embodi ment satisfies Equation 12, the optical system 1000 may improve aberration characteristics.

$$1.5 < d12\_CT/d12\_ET < 3 \quad \text{[Equation 13]}$$

In Equation 12, d12_CT means a distance on the optical axis OA between the sensor-side surface (second surface S2) of the first lens 110 and the object-side surface (third surface S3) of the second lens 120. d12_ET means a distance (mm) in a direction of the optical axis OA between the end of the effective region of the sensor-side surface (second surface S2) of the first lens 110 and the end of the effective region of the object-side surface (third surface S3) of the second lens 120. When the optical system 1000 according to the embodiment satisfies Equation 13, the optical system 1000 may control the incident light and thus have improved resolution.

$$0.1 < d12\_CT/d23\_CT < 1 \quad \text{[Equation 14]}$$

In Equation 14, d12_CT means a distance on the optical axis OA between the sensor-side surface (second surface S2) of the first lens 110 and the object-side surface (third surface S3) of the second lens 120. d23_CT means a distance on the optical axis between the sensor-side surface (fourth surface S4) of the second lens 120 and the object-side surface (fifth surface S5) of the third lens 130. When the optical system 1000 according to the embodiment satisfies Equation 14, the optical system 1000 may improve aberration characteristics.

$$0.1 < d23\_CT/d23\_ET < 1 \quad \text{[Equation 15]}$$

In Equation 15, d23_CT means a distance on the optical axis between the sensor-side surface (fourth surface S4) of the second lens 120 and the object-side surface (fifth surface S5) of the third lens 130. d23_ET means a distance (mm) in the direction of the optical axis OA between the end of the effective region of the sensor-side surface (fourth surface S4) of the second lens 120 and the end of the effective region of the object-side surface (fifth surface S5) of the third lens 130. When the optical system 1000 according to the embodiment satisfies Equation 15, the optical system 1000 may improve aberration characteristics.

$$0.05 < d67\_CT/d78\_CT < 1 \quad \text{[Equation 16]}$$

In Equation 15, d67_CT means a distance on the optical axis between the sensor-side surface (twelfth surface S12) of the sixth lens 160 and the object-side surface (thirteenth surface S13) of the seventh lens 170. d78_CT means a distance on the optical axis OA between the sensor-side surface (fourteenth surface S14) of the seventh lens 170 and the object-side surface (fifteenth surface S15) of the eighth lens 180. When the optical system 1000 according to the embodiment satisfies Equation 16, the optical system 1000 may improve aberration characteristics.

$$1 < d78\_CT/d78\_ET < 2.5 \quad \text{[Equation 17]}$$

In Equation 17, d78_CT means a distance on the optical axis OA between the sensor-side surface (fourteenth surface S14) of the seventh lens 170 and the object-side surface (fifteenth surface S15) of the eighth lens 180. d78_ET means a distance (mm) in a direction of the optical axis OA between the end of the effective region of the sensor side surface (fourteenth surface S14) of the seventh lens 170 and the end of the effective region of the object side surface (fifteenth surface S15) of the eighth lens 180. When the optical system 1000 according to the embodiment satisfies Equation 17, the optical system 1000 may improve the chromatic aberration and distortion characteristics of the periphery portion of the field of view (FOV).

$$1 < d89\_CT/d89\_ET < 2.5 \quad \text{[Equation 18]}$$

In Equation 18, d89_CT means a distance on the optical axis OA between the sensor-side surface (sixteenth surface S16) of the eighth lens 180 and the object-side surface (seventeenth surface S17) of the ninth lens 190. d89_ET means a distance (mm) in a direction of the optical axis OA between the end of the effective region of the sensor-side surface (sixteenth surface S16) of the eighth lens 180 and the end of the effective region of the object-side surface (seventeenth surface S17) of the ninth lens 190. When the optical system 1000 according to the embodiment satisfies Equation 18, the optical system 1000 may improve the aberration characteristic of the peripheral portion of the field of view (FOV).

$$2 < L7\_CT/d67\_CT < 3 \quad \text{[Equation 19]}$$

In Equation 18, L7_CT means a thickness (mm) on the optical axis OA of the seventh lens 170, and d67_CT means a distance on the optical axis OA between the sensor-side surface (twelfth surface S12) of the sixth lens 160 and the object-side surface (thirteenth surface S13) of the seventh lens 170. When the optical system 1000 according to the embodiment satisfies Equation 19, the optical system 1000 may have improved distortion aberration control characteristics.

$$0.05 < L1R1/L2R1 < 0.55 \quad \text{[Equation 20]}$$

In Equation 20, LIR1 means a radius (mm) of curvature on the optical axis OA of the object-side surface (first surface S1) of the first lens 110, and L2R1 means a radius (mm) of curvature on the optical axis OA of the object-side surface (third surface S3) of the second lens 120. When the optical system 1000 according to the embodiment satisfies Equation 20, the optical system 1000 may improve aberration characteristics.

$$1 < L1R2/L3R1 < 2 \quad \text{[Equation 21]}$$

In Equation 21, L1R2 means a radius (mm) of curvature on the optical axis OA of the sensor-side surface (second surface S2) of the first lens 110, and L3R1 means a radius (mm) of curvature on the optical axis OA of the object-side surface (fifth surface S5) of the third lens 130. When the optical system 1000 according to the embodiment satisfies Equation 21, the optical system 1000 may improve aberration characteristics.

$$5 < L7R1/L9R2 < 20 \quad \text{[Equation 22]}$$

In Equation 22, L7R1 means a radius (mm) of curvature on the optical axis OA of the object-side surface (thirteenth surface S13) of the seventh lens 170, and L9R2 means a radius (mm) of curvature on the optical axis OA of the sensor-side surface (eighteenth surface S18) of the ninth lens 190. When the optical system 1000 according to the embodiment satisfies Equation 22, the optical system 1000 may improve aberration characteristics and may have good optical performance at the center portion and the periphery portion of the field of view (FOV).

$$0.1 < |f1|/|f3| < 1 \quad \text{[Equation 23]}$$

In Equation 23, f1 means a focal length (mm) of the first lens 110, and f3 means a focal length (mm) of the third lens 130. When the optical system 1000 according to the embodiment satisfies Equation 23, the optical system 1000 may have improved resolution by controlling the refractive power of the first lens 110 and the third lens 130.

$$5 < |f2|/|f1| < 10 \quad \text{[Equation 24]}$$

In Equation 24, f1 means a focal length (mm) of the first lens 110, and f2 means a focal length (mm) of the second lens 120. When the optical system 1000 according to the embodiment satisfies Equation 24, the optical system 1000 may have improved resolution by controlling the refractive power of the first lens 110 and the second lens 120.

$$5 < |f13| < 10 \quad \text{[Equation 25]}$$

In Equation 25, f13 means a composite focal length (mm) of the first to third lenses 110, 120, and 130. When the optical system 1000 according to the embodiment satisfies Equation 25, the optical system 1000 may have improved resolution.

$$20 < |f49| < 100 \quad \text{[Equation 26]}$$

In Equation 26, f49 means a composite focal length (mm) of the fourth to ninth lenses 140, 150, 160, 170, 180 and 190. When the optical system 1000 according to the embodiment satisfies Equation 26, the optical system 1000 may improve aberration characteristics.

$$-1 < f13/f49 < 0 \quad \text{[Equation 27]}$$

In Equation 27, f13 means a composite focal length (mm) of the first to third lenses 110, 120 and 130, and f49 means the composite focal length (mm) of the fourth to ninth lenses 140, 150, 160, 170, 180 and 190. When the optical system 1000 according to the embodiment satisfies Equation 27, the optical system 1000 may have improved resolution and improved distortion aberration control characteristics.

$$1.5 < CA\_max/CA\_min < 5 \quad \text{[Equation 28]}$$

In Equation 28, CA_max means the effective diameter (CA, mm) of the lens surface having the largest effective diameter (CA) among the object-side surfaces and the sensor-side surfaces of the plurality of lenses 100. In addition, CA_min means the effective diameter (CA, mm) of the lens surface having the smallest effective diameter (CA) among the object-side surfaces and the sensor-side surfaces of each of the plurality of lenses 100. When the optical system 1000 according to the embodiment satisfies Equation 28, the optical system 1000 may have an appropriate size to be provided in a slim and compact structure while maintaining optical performance.

$$1.5 < CA\_max/CA\_Aver < 2.5 \quad \text{[Equation 29]}$$

In Equation 29, CA_max means the effective diameter (CA, mm) of the lens surface having the largest effective diameter (CA) among the object-side surfaces and the sensor-side surfaces of the plurality of lenses 100. In addition, CA_Aver means an average of the effective diameter (CA, mm) of the object-side surface and the sensor-side surface of the plurality of lenses 100. When the optical system 1000 according to the embodiment satisfies Equation 29, the optical system 1000 may be provided in a slim and compact structure, and may have an appropriate size for realizing optical performance.

$$0.5 < CA\_min/CA\_Aver < 1 \quad \text{[Equation 30]}$$

In Equation 30, CA_min means the effective diameter (CA, mm) of the lens surface having the smallest effective diameter (CA) among the object-side surfaces and the sensor-side surfaces of the plurality of lenses 100. In addition, CA_Aver means an average of the effective diameter (CA, mm) of the object-side surface and the sensor-side surface of the plurality of lenses 100. When the optical system 1000 according to the embodiment satisfies Equation 30, the optical system 1000 may be provided in a slim and compact structure, and may have an appropriate size for realizing optical performance.

$$0.5 < CA\_max/(2*ImgH) < 1 \quad \text{[Equation 31]}$$

In Equation 31, CA_max means the effective diameter (CA, mm) of the lens surface having the largest effective diameter (CA) among the object-side surfaces and the sensor-side surfaces of the plurality of lenses 100. ImgH means a vertical distance (mm) with respect to the optical axis OA from a region of a field 0, which is the center of the upper surface of the image sensor 300 overlapping the optical axis OA, to a region of a field 1.0 of the image sensor 300. That is, ImgH means ½ of the maximum diagonal length (mm) of the effective region of the image sensor 300. When the optical system 1000 according to the embodiment satisfies Equation 31, the optical system 1000 may be provided in a slim and compact structure.

$$2 < TTL < 20 \quad \text{[Equation 32]}$$

In Equation 32, TTL (Total Track Length) means a distance (mm) on the optical axis OA from the vertex of the object-side surface (first surface S1) of the first lens 110 to the upper surface of the image sensor 300.

$$2 < ImgH \quad \text{[Equation 33]}$$

In Equation 33, ImgH means a vertical distance (mm) with respect to the optical axis OA from a region of a field 0, which is the center of the upper surface of the image sensor 300 overlapping the optical axis OA, to a region of a field 1.0 of the image sensor 300. That is, ImgH means ½ of the maximum diagonal length (mm) of the effective region of the image sensor 300.

$$BFL < 2.5 \quad \text{[Equation 34]}$$

In Equation 34, BFL (Back focal length) means a distance (mm) on the optical axis OA from the vertex of the sensor-side surface of the lens closest to the image sensor 300 to the upper surface of the image sensor 300.

$$FOV < 120 \quad \text{[Equation 35]}$$

In Equation 35, a field of view (FOV) means an angle of view (degrees, °) of the optical system 1000.

$$0.5 < TTL/ImgH < 2 \quad \text{[Equation 36]}$$

In Equation 36, a relationship between total track length (TTL) and ImgH may be represented. When the optical system 1000 according to the embodiment satisfies Equation 36, the optical system 1000 may secure the BFL for applying the image sensor 300 having a relatively large size, for example, the image sensor 300 having a size of about 1 inch, and may have a smaller TTL, and thus may have a high-definition image quality and a slim structure.

$$0.1 < BFL/ImgH < 0.5 \quad \text{[Equation 37]}$$

In Equation 37, a relationship between a back focal length (BFL) and ImgH may be established. When the optical system 1000 according to the embodiment satisfies Equation 37, the optical system 1000 may secure the BFL for applying the image sensor 300 having a relatively large size, for example, the image sensor 300 having a size of about 1 inch, and may minimize the distance between the last lens and the image sensor 300, so that good optical properties may be obtained in the center portion and periphery portion of the field of view (FOV).

$$4 < TTL/BFL < 10 \quad \text{[Equation 38]}$$

In Equation 38, a relationship between total track length (TTL) and back focal length (BFL) may be established. When the optical system 1000 according to the embodiment satisfies Equation 38, the optical system 1000 may be provided in a slim and compact structure while securing the BFL.

$$0.1 < F/TTL < 1 \quad \text{[Equation 39]}$$

In Equation 39, F means the total focal length (mm) of the optical system 1000. In Equation 39, a relationship between a total focal length and a total track length (TTL) may be established. When the optical system 1000 according to the embodiment satisfies Equation 39, the optical system 1000 may be provided in a slim and compact structure.

$$3 < F/BFL < 8 \quad \text{[Equation 40]}$$

In Equation 40, the relationship between the total focal length (mm) of the optical system 1000 and the back focal length (BFL) may be established. When the optical system 1000 according to the embodiment satisfies Equation 40, the optical system 1000 may have a set angle of view and may be provided in a slim and compact structure. In addition, the optical system 1000 may minimize the distance between the last lens and the image sensor 300, and thus may have good optical characteristics at the periphery portion of the field of view (FOV).

$$1 < F/ImgH < 3 \quad \text{[Equation 41]}$$

In Equation 41, a relationship between F and ImgH may be established. When the optical system 1000 according to the embodiment satisfies Equation 41, a relatively large image sensor 300, for example, an image sensor 300 having a size of about 1 inch may be applied and may have the improved aberration characteristics.

The optical system 1000 according to the embodiment may satisfy at least one or two or more of Equations 1 to 41. In this case, the optical system 1000 may have improved optical properties. In detail, when the optical system 1000 satisfies at least one or two or more of Equations 1 to 41, the optical system 1000 may have improved resolution and may improve aberration and distortion characteristics. Also, the optical system 1000 may have good optical performance at the center portion and the periphery portion of the field of view (FOV). In addition, when the optical system 1000 satisfies at least one or two or more of Equations 1 to 41, the optical system 1000 may include the image sensor 300 of a relatively large size and have a relatively small TTL value, and the optical system 1000 and the camera module including the same may have a slimmer and more compact structure.

The distance between the plurality of lenses 100 in the optical system 1000 according to the embodiment may have a value set according to a region.

The first lens 110 and the second lens 120 may be spaced apart from each other by a first distance. The first distance may be an interval in a direction of the optical axis OA between the first lens 110 and the second lens 120. The first distance may change according to a position between the first lens 110 and the second lens 120. In detail, the first distance may change from the optical axis OA in a direction perpendicular to the optical axis OA when the optical axis OA is the starting point and the effective region end of the third surface S3 of the second lens 120 is the endpoint. That is, the first distance may change from the optical axis OA toward the end of the effective diameter of the third surface S3. A distance from the optical axis to the end or edge of the effective region of each lens surface may be expressed as an effective radius.

The first distance d12 between the sensor-side surface of the first lens 110 and the object-side surface of the second lens 120 in a direction perpendicular to the optical axis in the optical system 1000 according to the embodiment may be shown in Table 3 below.

TABLE 3

| Vertical height (mm) to the optical axis from the optical axis at the sensor-side surface of the first lens | First distance d12 (mm) | Vertical height (mm) to the optical axis from the optical axis at the object-side surface of the second lens |
|---|---|---|
| 0.000 | 0.0681 | 0.000 |
| 0.100 | 0.0677 | 0.100 |
| 0.200 | 0.0667 | 0.200 |
| 0.300 | 0.0651 | 0.300 |
| 0.400 | 0.0629 | 0.400 |
| 0.500 | 0.0602 | 0.500 |
| 0.600 | 0.0570 | 0.600 |
| 0.700 | 0.0536 | 0.700 |
| 0.800 | 0.0499 | 0.800 |
| 0.900 | 0.0461 | 0.900 |
| 1.000 | 0.0424 | 1.000 |
| 1.100 | 0.0388 | 1.100 |
| 1.200 | 0.0356 | 1.200 |
| 1.300 | 0.0328 | 1.300 |
| 1.347 (EG1) | 0.0307 | 1.347 (EG1) |

Referring to Table 3, the first distance may decrease from the optical axis OA toward a direction perpendicular to the optical axis OA. In detail, the first distance may decrease from the optical axis OA toward the first point EG1 located on the third surface S3. The first point EG1 may be an end of the effective region of the third surface S3. Here, a value of the first point EG1 is an effective radius value of the third surface S3 having a smaller effective diameter of the sensor-side second surface S2 of the first lens 110 and the object-side third surface S3 of the second lens 120 facing each other, and means ½ of the effective diameter value of the third surface S3 shown in Table 1. The first distance may have a maximum value on the optical axis OA. Also, the first distance may have a minimum value at the first point EG1 located on the third surface S3. The maximum value of the first distance may be about 1.5 times or more of the minimum value. In detail, the maximum value of the first distance may be about twice or more of the minimum value. In more detail, the maximum value of the first distance may be about 2 times to about 3 times the minimum value. Referring to Table 3, the maximum value of the first distance may be about 2.2 times the minimum value. In the optical system 1000 according to the embodiment, the first lens 110 and the second lens 120 may have the above-described first distance according to a region. Accordingly, the optical system 1000 may effectively control the light incident through the first lens 110. The second lens 120 and the third lens 130 may be spaced apart from each other by a second distance. The second distance may be a distance in the direction of the optical axis OA between the second lens 120 and the third lens 130. The second distance may vary according to a position between the second lens 120 and the third lens 130. In detail, when the optical axis OA is the starting point and the effective region end of the object-side fifth surface S5 of the third lens 130 is the endpoint, the second distance may change from the optical axis OA toward the vertical direction to the optical axis OA. That is, the second distance may change from the optical axis OA toward the end of the effective diameter of the fifth surface S5.

The second distance d23 between the sensor-side surface of the second lens 120 and the object-side surface of the third lens 130 along the direction perpendicular to the optical axis in the optical system 1000 according to the embodiment may be shown in Table 4 below.

TABLE 4

| Vertical height (mm) to the optical axis from the optical axis at the sensor-side surface of the second lens | Second distance d23 (mm) | Vertical height (mm) to the optical axis from the optical axis at the object-side surface of the third lens |
|---|---|---|
| 0.000 | 0.0902 | 0.000 |
| 0.100 | 0.0908 | 0.100 |
| 0.200 | 0.0926 | 0.200 |
| 0.300 | 0.0953 | 0.300 |
| 0.400 | 0.0988 | 0.400 |
| 0.500 | 0.1027 | 0.500 |
| 0.600 | 0.1069 | 0.600 |
| 0.700 | 0.1110 | 0.700 |
| 0.800 | 0.1148 | 0.800 |
| 0.900 | 0.1183 | 0.900 |
| 1.000 | 0.1216 | 1.000 |
| 1.100 | 0.1248 | 1.100 |
| 1.200 | 0.1288 | 1.200 |
| 1.247 (EG2) | 0.1347 | 1.247 (EG2) |

Referring to Table 4, the second distance may increase from the optical axis OA toward a direction perpendicular to the optical axis OA. In detail, the second distance may increase from the optical axis OA toward the second point EG2 located on the fifth surface S5. The second point EG2 may be an end of the effective region of the fifth surface S5. Here, the value of the second point EG2 is an effective radius value of the fifth surface S5 having a smaller effective diameter of the sensor-side surface (fourth surface S4) of the second lens 120 and the object-side surface (fifth surface S5) of the third lens 130 facing each other, and means ½ of the effective diameter value of the fifth surface S5 described in Table 1. The second distance may have a maximum value at the second point EG2 located on the fifth surface S5. Also, the second distance may have a minimum value in the optical axis OA. The maximum value of the second distance may be about 1.1 times or more of the minimum value. In detail, the maximum value of the second distance may be about 1.2 times or more of the minimum value. In more detail, the maximum value of the second distance may be about 1.2 times to about 2 times the minimum value. Referring to Table 4, the maximum value of the second distance may be about 1.49 times the minimum value. In the optical system 1000 according to the embodiment, the second lens 120 and the third lens 130 may have the above-described second distance according to a region. Accordingly, the optical system 1000 may effectively control the light incident through the first lens 110 and the second lens 120.

The sixth lens 160 and the seventh lens 170 may be spaced apart from each other by a third distance. The third distance may be a distance in the direction of the optical axis OA between the sixth lens 160 and the seventh lens 170. The third distance may vary according to a position between the sixth lens 160 and the seventh lens 170. In detail, when the optical axis OA is the starting point and the effective region end of the sensor-side twelfth surface S12 of the sixth lens 160 is the endpoint, the third distance may be changed from the optical axis OA toward the vertical direction to the optical axis OA. That is, the third distance may change from the optical axis OA toward the end of the effective diameter of the twelfth surface S12.

The third distance d67 between the sensor-side surface of the sixth lens 160 and the object-side surface of the seventh lens 170 along the direction perpendicular to the optical axis in the optical system 1000 according to the embodiment may be shown in Table 5 below.

TABLE 5

| Vertical height (mm) to the optical axis from the optical axis at the sensor-side surface of the sixth lens | Third distance d67 (mm) | Vertical height (mm) to the optical axis from the optical axis at the object-side surface of the seventh lens |
|---|---|---|
| 0.000 | 0.1236 | 0.000 |
| 0.100 | 0.1245 | 0.100 |
| 0.200 | 0.1271 | 0.200 |
| 0.300 | 0.1313 | 0.300 |
| 0.400 | 0.1370 | 0.400 |
| 0.500 | 0.1438 | 0.500 |
| 0.600 | 0.1516 | 0.600 |
| 0.700 | 0.1601 | 0.700 |
| 0.800 | 0.1692 | 0.800 |
| 0.900 | 0.1786 | 0.900 |
| 1.000 | 0.1883 | 1.000 |
| 1.100 | 0.1979 | 1.100 |
| 1.200 | 0.2068 | 1.200 |
| 1.300 | 0.2143 | 1.300 |
| 1.400 | 0.2194 | 1.400 |
| 1.500 (EG3) | 0.2206 | 1.500 (EG3) |
| 1.600 | 0.2159 | 1.600 |
| 1.700 | 0.2032 | 1.700 |
| 1.800 | 0.1804 | 1.800 |
| 1.900 | 0.1454 | 1.900 |
| 2.015 (EG4) | 0.0978 | 2.015 (EG4) |

Referring to Table 5, the third distance may increase from the optical axis OA toward a direction perpendicular to the optical axis OA. In detail, the third distance may increase from the optical axis OA toward the third point EG3 positioned on the twelfth surface S12. When the optical axis OA is the starting point and the effective region end of the twelfth surface S12 is the endpoint, the third point EG3 may be disposed in a range of about 65% to 85% based on a direction vertical to the optical axis OA. The third distance may decrease from the third point EG3 toward a direction perpendicular to the optical axis OA. For example, the third distance may decrease from the third point EG3 to the fourth point EG4 positioned on the twelfth surface S12. The fourth point EG4 may be the end of the effective region of the twelfth surface S12. Here, the value of the fourth point EG4 is an effective radius value of the twelfth surface S12 having a smaller effective diameter of the sensor-side surface (twelfth surface S12) of the sixth lens 160 and the object-side surface (thirteenth surface S13) of the seventh lens 170 facing each other, and means ½ of the effective diameter value of the twelfth surface S12 described in Table 1. The third distance may have a maximum value at the third point EG3. Also, the third distance may have a minimum value at the fourth point EG4. The maximum value of the third distance may be about 1.5 times or more of the minimum value. In detail, the maximum value of the third distance may be about twice or more than the minimum value. In more detail, the maximum value of the third distance may be about 2 times to about 4 times the minimum value. Referring to Table 3, the maximum value of the third distance may be about 2.26 times the minimum value. In the optical system 1000 according to the embodiment, the sixth lens 160 and the seventh lens 170 may have the above-described third distance according to a region. Accordingly, the optical system 1000 may have improved optical properties. In detail, the optical system 1000 may have improved aberration control characteristics as the sixth lens 160 and the seventh lens 170 have intervals set according to positions.

The seventh lens 170 and the eighth lens 180 may be spaced apart from each other by a fourth distance. The fourth distance may be a distance in a direction of the optical axis OA between the seventh lens 170 and the eighth lens 180. The fourth distance may vary according to a position between the seventh lens 170 and the eighth lens 180. In detail, when the optical axis OA is the starting point and the effective region end of the sensor-side surface (fourteenth surface S14) of the seventh lens 170 is the endpoint, the fourth distance may change from the optical axis OA toward a direction perpendicular to the optical axis OA. That is, the fourth distance may change from the optical axis OA toward an end of the effective diameter of the fourteenth surface S14.

The fourth distance d78 between the sensor-side surface of the seventh lens 170 and the object-side surface of the eighth lens 180 in a direction perpendicular to the optical axis in the optical system 1000 according to the embodiment may be shown in Table 6 below.

TABLE 6

| Vertical height (mm) to the optical axis from the optical axis at the sensor-side surface of the seventh lens | Fourth distance d78 (mm) | Vertical height (mm) to the optical axis from the optical axis at the object-side surface of the eighth lens |
|---|---|---|
| 0.000 | 0.4766 | 0.000 |
| 0.100 | 0.4773 | 0.100 |
| 0.200 | 0.4795 | 0.200 |
| 0.300 | 0.4833 | 0.300 |
| 0.400 | 0.4888 | 0.400 |
| 0.500 | 0.4961 | 0.500 |
| 0.600 | 0.5053 | 0.600 |
| 0.700 | 0.5165 | 0.700 |
| 0.800 | 0.5295 | 0.800 |
| 0.900 | 0.5440 | 0.900 |
| 1.000 | 0.5597 | 1.000 |
| 1.100 | 0.5761 | 1.100 |
| 1.200 | 0.5929 | 1.200 |
| 1.300 | 0.6096 | 1.300 |
| 1.400 | 0.6256 | 1.400 |

TABLE 6-continued

| Vertical height (mm) to the optical axis from the optical axis at the sensor-side surface of the seventh lens | Fourth distance d78 (mm) | Vertical height (mm) to the optical axis from the optical axis at the object-side surface of the eighth lens |
|---|---|---|
| 1.500 | 0.6406 | 1.500 |
| 1.600 | 0.6543 | 1.600 |
| 1.700 | 0.6664 | 1.700 |
| 1.800 | 0.6765 | 1.800 |
| 1.900 | 0.6843 | 1.900 |
| 2.000 (EG5) | 0.6889 | 2.000 (EG5) |
| 2.100 | 0.6881 | 2.100 |
| 2.200 | 0.6784 | 2.200 |
| 2.300 | 0.6560 | 2.300 |
| 2.330 (EG6) | 0.6186 | 2.330 (EG6) |

Referring to Table 6, the fourth distance may increase from the optical axis OA toward a direction perpendicular to the optical axis OA. In detail, the fourth distance may increase from the optical axis OA toward the fifth point EG5 located on the fourteenth surface S14. When the optical axis OA is the starting point and the effective region end of the fourteenth surface S14 is the endpoint, the fifth point EG5 may be disposed in a range of about 65% to about 95% based on the direction perpendicular to the optical axis OA. The fourth distance may decrease from the fifth point EG5 in a direction perpendicular to the optical axis OA. For example, the fourth distance may decrease from the fifth point EG5 to a sixth point EG6 located on the fourteenth surface S14. The sixth point EG6 may be the end of the effective region of the fourteenth surface S14. Here, the value of the sixth point EG6 is an effective radius of the fourteenth surface S14 having a smaller effective diameter of the sensor-side surface (fourteenth surface S14) of the seventh lens 170 and the object-side surface (fifteenth surface S15) of the eighth lens 180 facing each other, and means ½ of the effective diameter value of the fourteenth surface S14 described in Table 1. The fourth distance may have a maximum value at the fifth point EG5. Also, the fourth distance may have a minimum value in the optical axis OA. The maximum value of the fourth distance may be about 1.1 times or more of the minimum value. In detail, the maximum value of the fourth distance may be about 1.1 times to about 2.5 times the minimum value. In more detail, the maximum value of the fourth distance may be about 1.1 times to about 2 times the minimum value. Referring to Table 6, the maximum value of the fourth distance may be about 1.44 times the minimum value. In the optical system 1000 according to the embodiment, the seventh lens 170 and the eighth lens 180 may have the above-described fourth distance according to a region. Accordingly, the optical system 1000 may have improved optical properties. In detail, as the seventh lens 170 and the eighth lens 180 have distances set according to positions, improved optical properties may be obtained in the center and peripheral portions of the field of view (FOV).

Also, the eighth lens 180 and the ninth lens 190 may be spaced apart from each other by a fifth distance. The fifth distance may be a distance in a direction of the optical axis OA between the eighth lens 180 and the ninth lens 190. The fifth distance may vary according to a position between the eighth lens 180 and the ninth lens 190. In detail, when the optical axis OA is the starting point and the effective region end of the sensor-side surface (sixteenth surface S16) of the eighth lens 180 is the endpoint, the fifth distance may change from the optical axis OA toward a direction perpendicular to the optical axis OA. That is, the fifth distance may change from the optical axis OA toward the end of the effective region of the sixteenth surface S16.

In the optical system 1000 according to the embodiment, the fifth distance d89 between the sensor-side surface of the eighth lens 180 and the object-side surface of the ninth lens 190 along the direction perpendicular to the optical axis may be shown in Table 7 below.

TABLE 7

| Vertical height (mm) to the optical axis from the optical axis at the sensor-side surface of the eighth lens | Fifth distance d89 (mm) | Vertical height (mm) to the optical axis from the optical axis at the object-side surface of the ninth lens |
|---|---|---|
| 0.000 | 0.9229 | 0.000 |
| 0.100 | 0.9231 | 0.100 |
| 0.200 | 0.9236 | 0.200 |
| 0.300 (EG7) | 0.9240 | 0.300 (EG7) |
| 0.400 | 0.9238 | 0.400 |
| 0.500 | 0.9224 | 0.500 |
| 0.600 | 0.9190 | 0.600 |
| 0.700 | 0.9132 | 0.700 |
| 0.800 | 0.9043 | 0.800 |
| 0.900 | 0.8919 | 0.900 |
| 1.000 | 0.8757 | 1.000 |
| 1.100 | 0.8558 | 1.100 |
| 1.200 | 0.8322 | 1.200 |
| 1.300 | 0.8051 | 1.300 |
| 1.400 | 0.7750 | 1.400 |
| 1.500 | 0.7423 | 1.500 |
| 1.600 | 0.7074 | 1.600 |
| 1.700 | 0.6709 | 1.700 |
| 1.800 | 0.6334 | 1.800 |
| 1.900 | 0.5956 | 1.900 |
| 2.000 | 0.5583 | 2.000 |
| 2.100 | 0.5228 | 2.100 |
| 2.200 | 0.4908 | 2.200 |
| 2.300 | 0.4642 | 2.300 |
| 2.400 | 0.4454 | 2.400 |
| 2.500 (EG8) | 0.4367 | 2.500 (EG8) |
| 2.600 | 0.4402 | 2.600 |
| 2.700 | 0.4577 | 2.700 |
| 2.800 | 0.4899 | 2.800 |
| 2.900 | 0.5367 | 2.900 |
| 3.040 (EG9) | 0.5970 | 3.040 (EG9) |

Referring to Table 7, the fifth distance may increase from the optical axis OA toward a direction perpendicular to the optical axis OA. In detail, the fifth distance may increase from the optical axis OA toward the seventh point EG7 positioned on the sixteenth surface S16. When the optical axis OA is the starting point and the effective region end of the sixteenth surface S16 is the end point, the seventh point EG7 may be disposed in the range of about 5% to about 20% based on the direction perpendicular to the optical axis OA. The fifth distance may decrease from the seventh point EG7 in a direction perpendicular to the optical axis OA. For example, the fifth distance may decrease from the seventh point EG7 to the eighth point EG8 positioned on the sixteenth surface S16. The eighth point EG8 may be disposed in the range of about 75% to about 90% of an effective radius of the sixteenth surface S16 with respect to the optical axis. The eighth point EG8 may be disposed more outside than the seventh point EG7 with respect to the optical axis. The fifth distance may increase from the eighth point EG8 toward a direction perpendicular to the optical axis OA. For example, the fifth distance may increase from the eighth point EG8 to a ninth point EG9 located on the sixteenth surface S16. The eighth point EG8 may be the end of the effective region of the sixteenth surface S16. The ninth point EG9 may be disposed more outside than the eighth point EG8 with respect to the optical axis. Here, the value of the ninth point EG9 is an effective radius of the sixteenth surface S16 having a smaller effective diameter of the sensor-side sixteenth surface S16 of the eighth lens 180 and the object-side seventeenth surface S17 of the ninth lens 190 facing each other, and means ½ of the effective diameter value of the sixteenth surface S16 described in Table 1.

The fifth distance may have a maximum value at the seventh point EG7. Also, the fifth distance may have a minimum value at the eighth point EG8. The maximum value of the fifth distance may be about 1.5 times or more of the minimum value. In detail, the maximum value of the fifth distance may be about 1.5 times to about 2.5 times the minimum value. In more detail, the maximum value of the fifth distance may be about 1.8 times to about 2.4 times the minimum value. Referring to Table 7, the maximum value of the fifth distance may be about 2.12 times the minimum value. In the optical system 1000 according to the embodiment, the eighth lens 180 and the ninth lens 190 may have the above-described fifth distance according to a region. Accordingly, the optical system 1000 may have improved optical properties. In detail, since the eighth lens 180 and the ninth lens 190 have intervals set according to positions, improved optical properties may be obtained in the center and peripheral portions of the field of view (FOV).

In the optical system 1000 according to the embodiment, the plurality of lenses 100 may have a distance in the direction of the optical axis OA set according to the region as described above. Accordingly, the optical system 1000 may control chromatic aberration, distortion, and the like, and may have improved optical performance.

TABLE 8

| Item | Embodiment |
|---|---|
| F | 6.4992 mm |
| f1 | 6.9309 mm |
| f2 | 48.8174 mm |
| f3 | −16.5568 mm |
| f4 | 13.2626 mm |
| f5 | −20.0309 mm |
| f6 | 59.6174 mm |
| f7 | 528.2259 mm |
| f8 | 16.3381 mm |
| f9 | −5.8853 mm |
| f13 | 8.4961 mm |
| f49 | −42.5018 mm |
| L1_ET | 0.4047 mm |
| L2_ET | 0.2921 mm |
| L3_ET | 0.3262 mm |
| L4_ET | 0.2919 mm |
| L5_ET | 0.3380 mm |
| L6_ET | 0.2820 mm |
| L7_ET | 0.4351 mm |
| L8_ET | 0.3672 mm |
| L9_ET | 1.2001 mm |
| d12_ET | 0.0307 mm |
| d23_ET | 0.1297 mm |
| d34_ET | 0.0765 mm |
| d45_ET | 0.0760 mm |
| d56_ET | 0.3874 mm |
| d67_ET | 0.0611 mm |
| d78_ET | 0.3720 mm |
| d89_ET | 0.4900 mm |
| L9S2 Critical point | 0.52 |
| CA_max | 8.163 mm |
| CA_min | 2.391 mm |
| CA_Aver | 3.923 mm |
| BFL | 1.1184 mm |
| TTL | 7.6419 mm |
| ImgH | 5.0030 mm |

TABLE 8-continued

| Item | Embodiment |
|---|---|
| FOV | 75 degrees |
| EPD | 3.2 mm |
| F-number | 2.4 |

Table 8 relates to the items of the above-described equations in the optical system 1000 according to the embodiment, and in the optical system 1000, it relates to the total track length (TTL), back focal length (BFL), F value, ImgH, focal lengths f1, f2, f3, f4, f5, f6, f7, f8, and f9 of each of the first to the ninth lenses 110, 120, 130, 140, 150, 160, 170, 180, and 190, edge thickness (ET), etc. Here, the edge thickness of the lens means the thickness in the direction of the optical axis OA at the end of the effective region of the lens. In detail, the edge thickness of the lens means the distance in the direction of the optical axis OA from the end of the effective region on the object side of the lens to the end of the effective region on the sensor side.

TABLE 9

| | Equation | Embodiment |
|---|---|---|
| 1 | 2 < L1_CT/L3_CT < 4 | 3.191 |
| 2 | 0 < L1_ET/L1_CT < 1 | 0.507 |
| 3 | 1 < L9_ET/L9_CT < 4 | 2.180 |
| 4 | 1.6 < n3 | 1.671 |
| 5 | 1 < CA_L1S1/CA_L3S2 < 2 | 1.339 |
| 6 | 1 < CA_L9S2/CA_L4S2 < 5 | 2.935 |
| 7 | 1 < d34_CT/d34_ET < 5 | 3.610 |
| 8 | 1 < d89_CT/d89_min < 10 | 2.113 |
| 9 | 0.3 < L9 S2 Critical point < 0.7 | 0.520 |
| 10 | 5 < CA_L3S2/L3_CT < 10 | 9.563 |
| 11 | 1 < L2_CT/L2_ET < 2.5 | 1.122 |
| 12 | 1 < L2_CT/L3_CT < 2.5 | 1.311 |
| 13 | 1.5 < d12_CT/d12_ET < 3 | 2.220 |
| 14 | 0.1 < d12_CT/d23_CT < 1 | 0.755 |
| 15 | 0.1 < d23_CT/d23_ET < 1 | 0.696 |
| 16 | 0.05 < d67_CT/d78_CT < 1 | 0.259 |
| 17 | 1 < d78_CT/d78_ET < 2.5 | 1.281 |
| 18 | 1 < d89_CT/d89_ET < 2.5 | 1.883 |
| 19 | 2 < L7_CT/d67_CT < 3 | 2.702 |
| 20 | 0.05 < L1R1/L2R1 < 0.55 | 0.216 |
| 21 | 1 < L1R2/L3R1 < 2 | 1.088 |
| 22 | 5 < L7R1/L9R2 < 20 | 10.139 |
| 23 | 0.1 < \|f1\|/\|f3\| < 1 | 0.419 |
| 24 | 5 < \|f2\|/\|f1\| < 10 | 7.043 |
| 25 | 5 < \|f13\| < 10 | 8.496 |
| 26 | 20 < \|f49\| < 100 | −42.502 |
| 27 | −1 < f13/f49 < 0 | −0.200 |
| 28 | 1.5 < CA_max/CA_min < 5 | 3.414 |
| 29 | 1.5 < CA_max/CA_Aver < 2.5 | 2.081 |
| 30 | 0.5 < CA_min/CA_Aver < 1 | 0.609 |
| 31 | 0.5 < CA_max/(2 * ImgH) < 1 | 0.816 |
| 32 | 2 < TTL < 20 | 7.642 |
| 33 | 2 < ImgH | 5.003 |
| 34 | BFL < 2.5 | 1.118 |
| 35 | FOV < 120 | 75.000 |
| 36 | 0.5 < TTL/ImgH < 2 | 1.527 |
| 37 | 0.1 < BFL/ImgH < 0.5 | 0.224 |
| 38 | 4 < TTL/BFL < 10 | 6.833 |
| 39 | 0.1 < F/TTL < 1 | 0.850 |
| 40 | 3 < F/BFL < 8 | 5.811 |
| 41 | 1 < F/ImgH < 3 | 1.299 |

Table 9 shows the result values of Equations 1 to 41 described above in the optical system 1000 according to the embodiment. Referring to Table 9, it may be seen that the optical system 1000 according to the embodiment satisfies at least one or two or more of Equations 1 to 41. In detail, it may be seen that the optical system 1000 according to the embodiment satisfies all of Equations 1 to 41. Accordingly, the optical system 1000 according to the embodiment may have good optical performance and excellent aberration characteristics as shown in FIG. 2.

FIG. 2 is a graph of the aberration diagram of the optical system 1000 according to the embodiment, in which spherical aberration (Longitudinal spherical aberration), astigmatic field curves, and distortion are measured from left to right. In FIG. 2, the X-axis may indicate a focal length (mm) or distortion (%), and the Y-axis may indicate the height of an image. In addition, the graph for spherical aberration is a graph for light in a wavelength band of about 470 nm, about 510 nm, about 555 nm, about 610 nm, and about 650 nm, and the graph for astigmatism and distortion aberration is a graph for light in a wavelength band of 555 nm. That is, referring to FIG. 2, the optical system 1000 according to the embodiment has improved resolution as the plurality of lenses 100 have a set shape, focal length, set distance, etc., and may have good optical performance even at the center portion and the periphery portion of the field of view (FOV).

Figure 3:
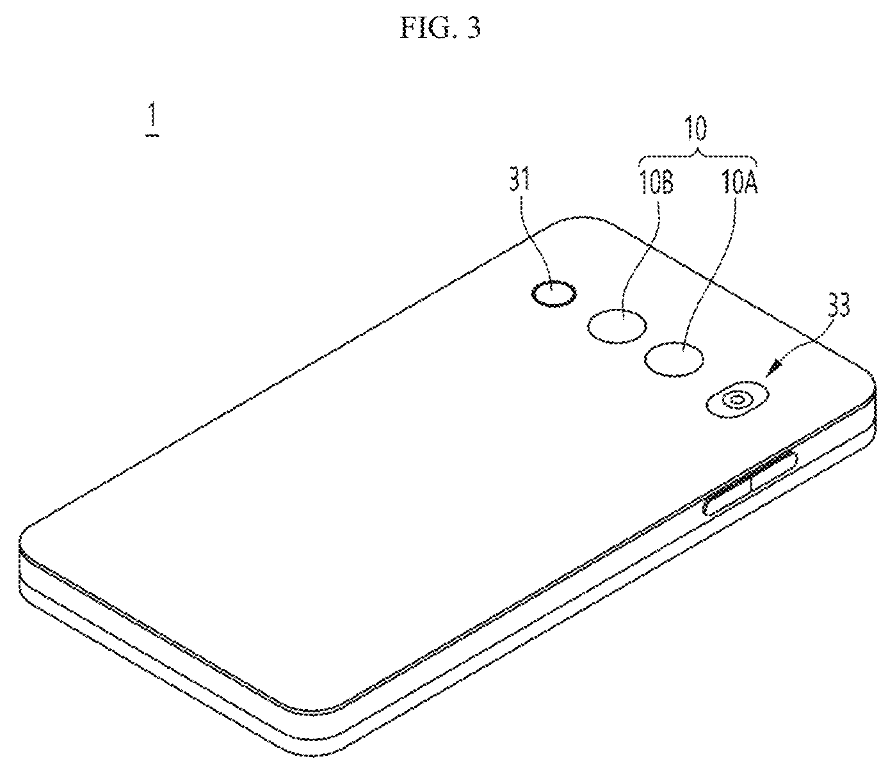
FIG. 3 is a diagram illustrating that the camera module according to the embodiment is applied to a mobile terminal.

FIG. 3 is a diagram illustrating that the camera module according to the embodiment is applied to a mobile terminal.

Referring to FIG. 3, the mobile terminal 1 may include a camera module 10 provided on the rear side. The camera module 10 may include an image capturing function. Also, the camera module 10 may include at least one of an auto focus function, a zoom function, and an OIS function. The camera module 10 may process a still video image or an image frame of a moving image obtained by the image sensor 300 in an imaging mode or a video call mode. The processed image frame may be displayed on a display unit (not shown) of the mobile terminal 1 and may be stored in a memory (not shown). In addition, although not shown in the drawings, the camera module may be further disposed on the front of the mobile terminal 1. For example, the camera module 10 may include a first camera module 10A and a second camera module 10B. In this case, at least one of the first camera module 10A and the second camera module 10B may include the above-described optical system 1000 and the image sensor 300. In addition, the camera module 10 may have a slim structure and may have improved distortion and aberration characteristics, the camera module may be provided more compactly by the optical system 1000 having a slim structure. In addition, the camera module 10 may have good optical performance even at the center and the periphery portions of the field of view (FOV).

The mobile terminal 1 may further include an autofocus device 31. The auto focus device 31 may include an auto focus function using a laser. The auto focus device 31 may be mainly used in a condition in which the auto focus function using the image of the camera module 10 is deteriorated, for example, in proximity of 10 m or less or in a dark environment. The autofocus device 31 may include a light emitting unit including a vertical cavity surface emission laser (VCSEL) semiconductor device and a light receiving unit that converts light energy such as a photodiode into electrical energy. The mobile terminal 1 may further include a flash module 33. The flash module 33 may include a light emitting device emitting light therein. The flash module 33 may be operated by a camera operation of a mobile terminal or a user's control.

Features, structures, effects, etc. described in the above embodiments are included in at least one embodiment of the invention, and are not necessarily limited to only one embodiment. Furthermore, features, structures, effects, etc. illustrated in each embodiment may be combined or modified for other embodiments by those of ordinary skill in the art to which the embodiments belong. Accordingly, the contents related to such combinations and modifications should be interpreted as being included in the scope of the invention. In addition, although the embodiment has been described above, it is only an example and does not limit the invention, and those of ordinary skill in the art to which the invention pertains are exemplified above in a range that does not depart from the essential characteristics of the present embodiment. It may be seen that various modifications and applications that have not been made are possible. For example, each component specifically shown in the embodiment may be implemented by modification. And the differences related to these modifications and applications should be construed as being included in the scope of the invention defined in the appended claims.

The invention claimed is:

1. An optical system comprising:

first to ninth lenses disposed along an optical axis in a direction from an object side to a sensor side, wherein the first lens has a positive (+) refractive power on the optical axis, wherein the second lens has a positive (+) refractive power on the optical axis, wherein the third lens has a negative (−) refractive power on the optical axis, wherein the fifth lens has a positive (+) refractive power on the optical axis, wherein the ninth lens has a negative (−) refractive power on the optical axis, wherein the fifth lens has a meniscus shape convex toward the sensor side on the optical axis, wherein an object-side surface of the sixth lens has a convex shape on the optical axis, wherein a sensor-side surface of the seventh lens has a concave shape on the optical axis, L1_CT is a thickness of the first lens in the optical axis, L3_CT is a thickness of the third lens in the optical axis, wherein the optical system satisfies the following Equation:

$$2 < L1\_CT/L3\_CT < 4;$$

d67_CT means a distance between a sensor-side surface of the sixth lens and an object-side surface of the seventh lens in the optical axis, d78_CT means a distance between the sensor-side surface of the seventh lens and an object-side surface of the eighth lens in the optical axis, and wherein the optical system satisfies the following Equation:

$$0.05 < d67\_CT/d78\_CT < 1.$$

2. The optical system of claim 1, wherein the first lens has a meniscus shape convex toward the object side on the optical axis, wherein a thickness of the second lens in the optical axis is L2_CT, wherein the optical system satisfies the following Equation:

$$1 < L2\_CT/L3\_CT < 2.5. \quad \text{Equation}$$

3. The optical system of claim 1, wherein a refractive index of the third lens is greater than 1.6.

4. The optical system of claim 1, wherein the second lens, the fourth lens, and the sixth lens have a positive (+) refractive power.

5. The optical system of claim 1, L1_ET is a between an end of an effective region of the object-side surface of the first lens and an end of an effective region of a sensor-side surface of the first lens in a direction of the optical axis, and wherein the following equation satisfies:

$$0 < L1\_ET/L1\_CT < 1. \quad \text{Equation}$$

6. An optical system comprising:

first to ninth lenses disposed along an optical axis in a direction from an object side to a sensor side, wherein the first lens has a positive (+) refractive power on the optical axis, wherein the second lens has a positive (+) refractive power on the optical axis, wherein the third lens has a negative (−) refractive power on the optical axis, wherein the fifth lens has a positive (+) refractive power on the optical axis, wherein the sixth lens has a positive (+) refractive power, wherein the ninth lens has a negative (−) refractive power on the optical axis, wherein an object-side surface of the sixth lens has a convex shape on the optical axis, wherein a sensor-side surface of the seventh lens has a concave shape on the optical axis, wherein a sensor-side surface of the ninth lens includes a critical point, wherein the critical point of the ninth lens is disposed in a range of 30% to 70% of an effective radius of the sensor-side surface of the ninth lens with respect to the optical axis, d67_CT means a distance between a sensor-side surface of the sixth lens and an object-side surface of the seventh lens in the optical axis, d78_CT means a distance between the sensor-side surface of the seventh lens and an object-side surface of the eighth lens in the optical axis, and wherein the optical system satisfies the following Equation:

$$0.05 < d67\_CT/d78\_CT < 1.$$

7. The optical system of claim 6, wherein an object-side surface of the first lens has a convex shape on the optical axis, CA_L1S1 is an effective diameter of the object-side surface of the first lens, CA_L3S2 is an effective diameter of the sensor-side surface of the third lens, wherein the following equation satisfies:

$$1 < CA\_L1S1/CA\_L3S2 < 2. \quad \text{Equation}$$

8. The optical system of claim 6,

CA_L4S2 is an effective diameter of a sensor-side surface of the fourth lens,

CA_L9S2 is an effective diameter of the sensor-side surface of the ninth lens, wherein the following equation satisfies:

$$1 < CA\_L9S2/CA\_L4S2 < 5. \quad \text{Equation}$$

9. The optical system of claim 6, wherein a sensor-side surface of the eighth lens includes a critical point, wherein the critical point of the eighth lens is disposed at 80% or less of an effective radius of the sensor-side surface of the eighth lens with respect to the optical axis.

10. The optical system of claim 9, wherein the seventh lens has a meniscus shape convex toward the object side on the optical axis, and wherein a refractive index of the seventh lens is greater than or equal to a refractive index of the eighth lens.

11. An optical system comprising:

first to ninth lenses disposed along an optical axis in a direction from an object side to a sensor side, wherein the first lens has a positive (+) refractive power on the optical axis, wherein the second lens has a positive (+) refractive power on the optical axis, wherein the third lens has a negative (−) refractive power on the optical axis, wherein the fifth lens has a positive (+) refractive power on the optical axis, wherein the ninth lens has a negative (−) refractive power on the optical axis, wherein an object-side surface of the sixth lens has a convex shape on the optical axis, wherein a sensor-side surface of the seventh lens has a concave shape on the optical axis, wherein a distance in a direction of the optical axis between the first and second lenses decreases from the optical axis toward a direction perpendicular to the optical axis, d67_CT means a distance between a sensor-side surface of the sixth lens and an object-side surface of the seventh lens in the optical axis, d78_CT means a distance between the sensor-side surface of the seventh lens and an object-side surface of the eighth lens in the optical axis, and wherein the optical system satisfies the following Equation:

$$0.05 < d67\_CT/d78\_CT < 1.$$

12. The optical system of claim 11, wherein a sensor-side surface of the second lens has a concave shape on the optical axis, d12_CT means a distance between a sensor-side surface of the first lens and an object-side surface of the second lens in the optical axis, d12_ET means a distance between an end of an effective region of the sensor-side surface of the first lens and an end of an effective region of the object-side surface of the second lens in a direction of the optical axis, and wherein the following equation satisfies:

$$1.5 < d12\_CT/d12\_ET < 3. \quad \text{Equation}$$

13. The optical system of claim 11, wherein the second lens has a meniscus shape convex toward the object side on the optical axis, wherein a distance in a direction of the optical axis between the second and third lenses increases from the optical axis toward the direction perpendicular to the optical axis, wherein a thickness of the second lens in the optical axis is L2_CT, wherein a thickness of the third lens in the optical axis is L3_CT, and wherein the optical system satisfies the following Equation:

$$1 < L2\_CT/L3\_CT < 2.5.$$

14. The optical system of claim 13, d23_CT means a distance between a sensor-side surface of the second lens and an object-side surface of the third lens in the optical axis, d23_ET means a distance between an end of an effective region of a sensor-side surface of the second lens and an end of an effective region of the object-side surface of the third lens in the direction of the optical axis, and wherein the following equation satisfies:

$$0.1 < d23\_CT/d23\_ET < 1.$$

15. The optical system of claim 11, wherein a distance in a direction of the optical axis between the eighth and ninth lenses increases from the optical axis toward a seventh point located on a sensor-side surface of the eighth lens, decreases from the seventh point to an eighth point located on the sensor-side surface of the eighth lens, and decreases from the eighth point to a ninth point located on the sensor-side surface of the eighth lens, wherein the eighth point is disposed more outside than the seventh point with respect to the optical axis, and wherein the ninth point is disposed more outside than the eighth point with respect to the optical axis and is an end of an effective region of the sensor-side surface of the eighth lens.

16. The optical system of claim 11, wherein the sixth lens has a positive (+) refractive power.

17. The optical system of claim 11, wherein an object-side surface of the first lens has a convex shape on the optical axis.

18. The optical system of claim 17, wherein an object-side surface of the fourth lens has a convex shape on the optical axis, and wherein a sensor-side surface of the fourth lens has a convex shape on the optical axis.

19. The optical system of claim 1, wherein a sensor-side surface of the second lens has a concave shape on the optical axis, and wherein an object-side surface of the seventh lens has a convex shape on the optical axis.

20. The optical system of claim 1, wherein an object-side surface of the fourth lens has a convex shape on the optical axis, and wherein a sensor-side surface of the fourth lens has a convex shape on the optical axis.

* * * * *